United States Patent
Yokoyama et al.

(10) Patent No.: US 12,399,141 B2
(45) Date of Patent: Aug. 26, 2025

(54) DAMAGE MEASUREMENT METHOD, APPARATUS AND PROGRAM, AND X-RAY DIFFRACTION APPARATUS

(71) Applicants: Rigaku Corporation, Tokyo (JP); Chubu Electric Power Company, Incorporated, Aichi (JP)

(72) Inventors: Ryouichi Yokoyama, Tokyo (JP); Kazuhiko Omote, Tokyo (JP); Daisuke Kobayashi, Aichi (JP)

(73) Assignees: RIGAKU CORPORATION, Tokyo (JP); CHUBU ELECTRIC POWER COMPANY, INCORPORATED, Aichi (JP)

( * ) Notice: Subject to any disclaimer, the term of this patent is extended or adjusted under 35 U.S.C. 154(b) by 208 days.

(21) Appl. No.: 18/124,585

(22) Filed: Mar. 22, 2023

(65) Prior Publication Data

US 2023/0304948 A1 Sep. 28, 2023

(30) Foreign Application Priority Data

Mar. 23, 2022 (JP) ................................ 2022-046746

(51) Int. Cl.
*G01N 23/2055* (2018.01)
(52) U.S. Cl.
CPC ................................ *G01N 23/2055* (2013.01)
(58) Field of Classification Search
CPC .................................................... G01N 23/2055
See application file for complete search history.

(56) References Cited

U.S. PATENT DOCUMENTS

| | | | | |
|---|---|---|---|---|
| 5,235,523 A * | 8/1993 | Karen | ..................... | G01B 7/004 702/28 |
| 6,005,913 A * | 12/1999 | Zombo | ................... | G01N 23/20 378/71 |
| 7,212,607 B1 * | 5/2007 | Rao | .......................... | G01N 23/18 378/58 |
| 7,796,726 B1 * | 9/2010 | Gendreau | .............. | G01N 23/20 378/80 |
| 9,129,715 B2 * | 9/2015 | Adler | ...................... | G01N 23/04 |
| 11,448,603 B1 * | 9/2022 | Norman | ............ | G01N 21/9505 |

(Continued)

FOREIGN PATENT DOCUMENTS

| JP | 4719836 B2 | 7/2011 |
|---|---|---|
| JP | 5324735 B2 | 10/2013 |
| JP | 2020159850 A * | 10/2020 |

OTHER PUBLICATIONS

Translation of JP-2020159850 (Year: 2020).*
Japanese Office Action issued Apr. 22, 2025 in corresponding Japanese Patent Application No. 2022-046746, 6 pages.

*Primary Examiner* — David J Makiya
*Assistant Examiner* — Soorena Kefayati
(74) *Attorney, Agent, or Firm* — XSENSUS LLP

(57) ABSTRACT

A damage measurement technique capable of measuring damage of a sample in a single crystal state, regardless of the surrounding condition, includes irradiating microbeam white X-rays to a sample in a single crystal state, diffraction of a spot generated by the irradiation is detected, a coefficient on variance of an intensity distribution in a specific direction in the detected diffraction spot is calculated, and a damaged state of the sample is specified based on the calculated coefficient.

19 Claims, 32 Drawing Sheets

(56) References Cited

U.S. PATENT DOCUMENTS

| | | | |
|---|---|---|---|
| 2005/0074092 A1* | 4/2005 | Borgstahl | G01N 23/2055 378/98.8 |
| 2005/0139772 A1* | 6/2005 | Hasegawa | H01J 37/29 250/311 |
| 2009/0103680 A1* | 4/2009 | Park | G01N 23/207 378/73 |
| 2010/0239068 A1* | 9/2010 | Belassel | G01N 23/20 250/306 |
| 2011/0164729 A1* | 7/2011 | Kikuchi | G01N 23/207 378/71 |
| 2015/0362500 A1* | 12/2015 | Anker | G01N 23/223 600/431 |
| 2019/0003988 A1* | 1/2019 | Solarz | G01N 21/4788 |
| 2019/0120753 A1* | 4/2019 | Prater | G01N 21/59 |
| 2020/0225171 A1* | 7/2020 | Griffiths | G01N 29/0681 |
| 2021/0025835 A1* | 1/2021 | Griffiths | G01N 23/20 |
| 2022/0026377 A1* | 1/2022 | Yamamoto | G01N 23/2252 |

* cited by examiner

DAMAGE MEASUREMENT METHOD, APPARATUS AND PROGRAM, AND X-RAY DIFFRACTION APPARATUS

CROSS-REFERENCE TO RELATED APPLICATION

The present application claims priority to Japanese Patent Application No. 2022-046746, filed on Mar. 23, 2022, the entire contents of which are incorporated by reference in this application.

BACKGROUND

Field

The present disclosure relates to a damage measurement method, apparatus, program, and an X-ray diffraction apparatus for measuring damage to a sample using white X-rays.

Description of the Related Art

Conventionally, there has been known a method of measuring damage of a member used in an environment of high temperature and high load by an X-ray diffraction method. In the method described in Patent Document 1, the rocking curve is measured for the index same as the forbidden reflection of the γ phase with respect to the γ' phase of the nickel-based superalloy, and damage due to deformation of the nickel-based superalloy is diagnosed based on the full width at half maximum of the diffraction peak. However, such a method is mainly used in a radiation facility, and involves a complicated work of rotating a sample to determine a crystal orientation.

On the other hand, in the method described in Patent Document 2, a sample is placed so that the damage direction is parallel to the surface of the sample stage, and a diffraction spot image obtained by the reflection Laue method is measured with a two-dimensional detector with respect to a sample in a single crystal state, and the full width at half maximum (FWHM) in the damage direction is calculated to diagnose the degradation of the sample. As a result, complicated work becomes unnecessary, and measurement analysis in the laboratory becomes possible.

Patent Document 3 discloses a method for determining the crystal orientation of a single crystal in a reflection Laue image. That is, the sensitive surface of the detector is arranged in the direction in which the reflection Laue image is projected and is set to be inclined with respect to the ψ angle direction. In this case, the crystal state of the inside of the sample having a depth of about 20 μm with less strain is measured using short-wavelength X-rays transmitted through the strained layer of the casting surface.

PATENT DOCUMENTS

Patent Document 1: JP-Patent No. 4719836
Patent Document 2: JP-A-2020-159850
Patent Document 3: JP-Patent No. 5324735

As described above, damage measurement techniques of members used in high-temperature and high-load environments using X-rays has been improved. However, if a sample in a single crystal state is measured as it is regardless of the surrounding condition, the sample is affected by the region.

For example, in a turbine blade for thermal power generation, a thermal barrier coating having a thickness of 100 μm or more is formed on a nickel-based superalloy. When such a turbine blade is irradiated with X-rays, the X-rays are absorbed by the thermal barrier coating and do not reach the nickel-based superalloy crystal of the base material. Therefore, in the case of measuring the damage of a member having a coating by the prior art, the thermal barrier coating on the surface thereof must be removed in advance.

SUMMARY

The present disclosure has been made in view of such circumstances, regardless of the surrounding condition, it is an object of the present disclosure to provide a damage measurement method, apparatus and program, and an X-ray diffraction apparatus capable of measuring the damage of the sample in a single crystal state.

(1) In order to achieve the above object, the damage measurement method of the present disclosure comprises the following steps of irradiating microbeam white X-rays to a sample in a single crystal state, detecting a diffraction spot generated by the irradiation, calculating a coefficient on variance of an intensity distribution in a specific direction in the detected diffraction spot, and specifying a damage state of the sample from the calculated coefficient.

(2) Further, in the damage measurement method of the present disclosure, the damage state is defined by a degree of damage and a direction of damage.

(3) Further, in the damage measurement method of the present disclosure, the sample is a metal material having a dendritic structure.

(4) Further, in the damage measuring method of the present disclosure, the sample is a single crystal material, a directionally solidified material or a polycrystalline material.

(5) Further, in the damage measurement method of the present disclosure, the irradiated white X-ray is incident at 90° with respect to the surface of the sample, and the diffraction spot is detected by a transmission method.

(6) Further, in the damage measurement method of the present disclosure, the energy of the irradiated white X-ray is set such that a transmittance at a position in a depth 7 mm in the sample from an incident position on the sample is 1/e or higher.

(7) Further, in the damage measurement method of the present disclosure, the sample is coated with a polycrystalline coating.

(8) Further, in the damage measurement method of the present disclosure, the white X-ray to be irradiated is formed into a focal size at a sample position equivalent to a grain size of a subcrystalline grain in the sample.

(9) Further, in the damage measurement method of the present disclosure, the irradiated white X-rays are formed at a focal spot size of 150 μm or more and 500 μm or less at a sample position.

(10) Further, in the damage measuring method of the present disclosure, the divergence angle of the white X-ray to be irradiated is 0.2° or less.

(11) Further, the X-ray diffractometer of the present disclosure comprises an X-ray irradiation section for irradiating microbeam white X-rays to a sample, a sample stage for mounting the sample, and an X-ray detection section for detecting diffracted X-rays by the sample, wherein the sample is in a single crystal state.

(12) Further, in the X-ray diffraction apparatus of the present disclosure, the X-ray irradiation section includes a collimator for forming a divergence angle of the irradiated white X-rays to 0.2° or less.

(13) Further, the damage measurement apparatus of the present disclosure comprises a coefficient calculating section for calculating a coefficient on variance of an intensity distribution in a specific direction in a diffraction spot based on intensity data acquired by irradiating microbeam white X-rays to a sample in a single crystal state, and a damage state specifying section for specifying a damage state of the sample based on the calculated coefficient.

(14) Further, the damage measurement program of the present disclosure causes a computer to execute the following processing of calculating a coefficient on variance of an intensity distribution in a specific direction in a diffraction spot based on intensity data acquired by irradiating microbeam white X-rays to a sample in a single crystal state and specifying a damage state of the sample based on the calculated coefficient.

DETAILED DESCRIPTION

Figure 1A:
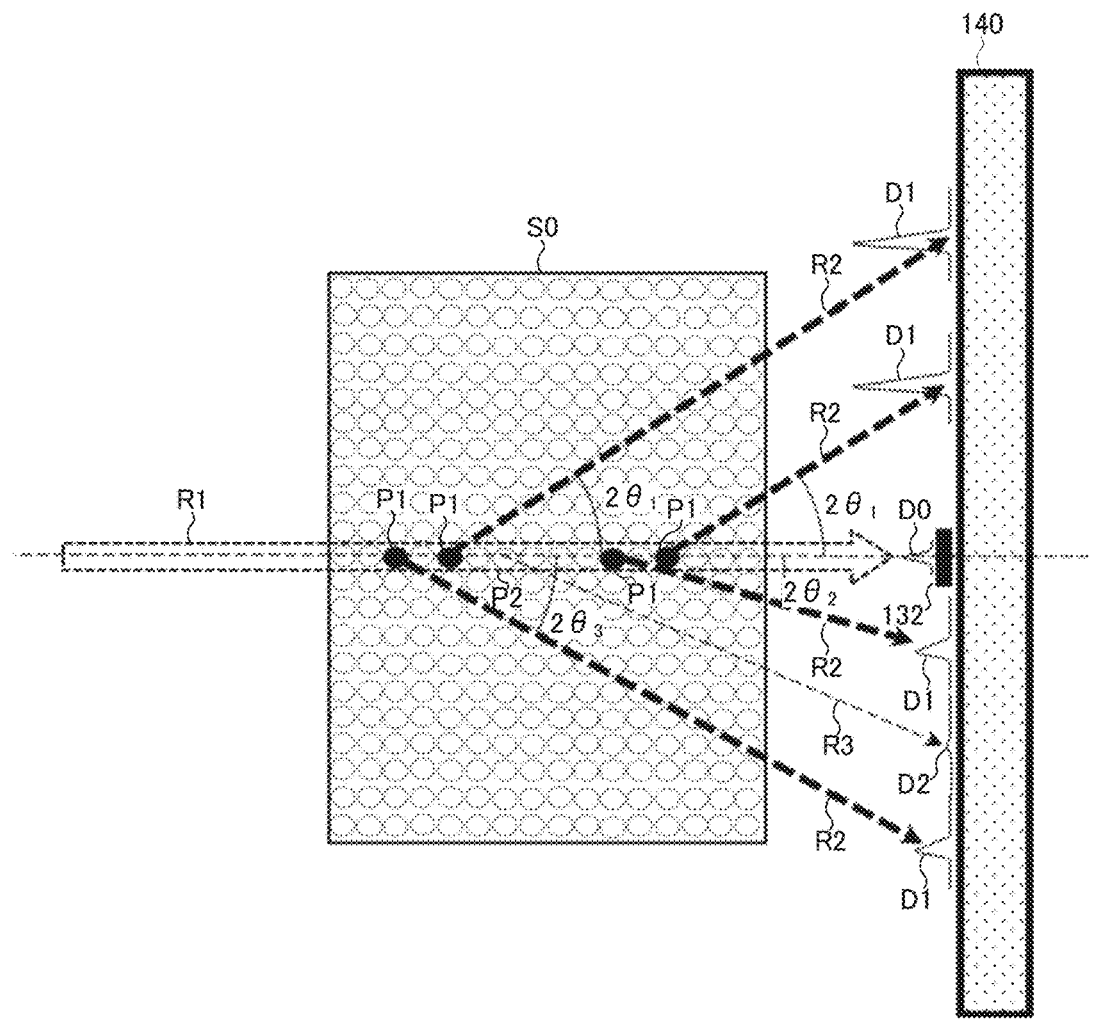
FIGS. 1A and 1B are schematic and enlarged views showing X-ray diffraction in a sample having a dendritic structure in a single crystal state, respectively.

Next, embodiments of the present disclosure are described with reference to the drawings. To facilitate understanding of the description, the same reference numerals are assigned to the same components in the respective drawings, and duplicate descriptions are omitted.

[Samples of Interest]

In the present disclosure, a state of a sample having a single crystal portion that can be irradiated with X-rays as an object of damage measurement is referred to as a "single crystal state". That is, the single crystal state refers to a state of a sample formed by a single crystal or coarse crystal grains that can be irradiated to a part of a single crystal or one of coarse crystal grains in the sample material by shaping an X-ray beam diameter. In a single crystal state, the measurement region in the material and the beam diameter of the X-ray are relatively related to each other. For example, a metal material having a dendritic structure is composed of a large number of dendritic subcrystalline grains having grain sizes of about several hundred μm. The single crystal state of the sample refers to a state of irradiating the sample with a micro X-ray beam having an X-ray beam diameter of several hundred μm in accordance with the grain size of the subcrystalline grains. Due to the subcrystalline grain boundaries present in the dendritic structure, the orientations of adjacent subcrystalline grains (constituted by mosaic-like crystallites) within the structure vary from one another. For example, in the case of a turbine blade, it is known that the variation in the orientation of the subcrystalline grains is several degrees in the entire material, and the variation between adjacent subcrystalline grains is 5° or less.

In a thermal power plant, a plurality of stages of turbines are installed side by side according to the purpose of the generator. Nickel-based superalloys are used in all 3- to 4-stage turbine blades (rotor blades) that are exposed to high temperature environments. For the first and second stage turbine blades, in particular, directionally solidified blades or single crystal blades are used. A directionally solidified material used as such a turbine blade material is formed of single crystals of a rod shape having a width of several mm with a nickel-based superalloy as a constituent and is in a single crystal state.

In the subcrystalline grains of the nickel-based superalloy, a composite material composed of a nickel solid solution matrix phase (γ phase (gamma phase)) and a nickel-based intermetallic compound precipitation phase (γ' phase (gamma prime phase)) forms a single crystal. The γ phase is formed of a fcc structure with a face-centered cubic lattice of Ni atoms. The γ' phase is formed of a cube superlattice structure in which the atoms at the corners of the face-centered cubic lattice are replaced with Al or Ti atoms.

In nickel-based superalloys, lumps of numerous γ' phases are regularly arranged three-dimensionally, and a network structure consisting of γ phases surrounds each γ' phase lump to form a single crystal. Although the composite materials are composed of different phases, their orientations are identical to each other. Thus, in the nickel-based superalloy, the γ'-phase is consistently scattered in the γ-phase to form a single crystal state.

Turbine blades of turbine engines and jet engines are exposed to high temperatures and stresses, which may lead to premature damage and shorter life than expected.

For example, when a nickel-based superalloy is used for a turbine blade, a centrifugal force causes the turbine blade to extend in the [001] direction in the subcrystalline grains. The direction of extension is the damage direction. Then, disturbance occurs in the regular arrangement of the single crystal state in the process up to breakage due to damage deformation or the like. The direction and degree of the disturbance of the arrangement appears as the damage direction and the damage degree. Note that the damage state refers to the damage degree and the damage direction.

When a base material in a single crystal state is irradiated with white X-rays, so-called Laue spots are generated as diffraction spots. Laue spots in the state where the base material in a single crystal state is not deformed at all appear in the shape with the circle outer periphery, thereafter, as the base material is deformed, a circle becomes ellipse in the outer peripheral shape of the Laue spots, and the major axis of the ellipse further extends. For example, when the damage to nickel-based superalloys is evaluated, the disturbances in the crystal structure of the γ and γ' phases are observed as the broadening of the diffraction peaks by the diffraction planes in the crystal.

In the present disclosure, an apparatus optical system in which a single diffraction peak that the γ phase and the γ' phase multiply generate is observed in a laboratory is adopted. The coefficient on the variance of the diffraction spot corresponds to the damage of the nickel-based superalloy and the relation is utilized. In this way, by specifying the damaged state of the turbine blade, the remaining life of the turbine blade can be estimated.

When a sample of a nickel-based superalloy is irradiated with white X-rays, the diffraction spot contains information on both the γ-phase and the γ'-phase, and the single crystal state of the two phases is observed. The dislocation density changes with the damage deformation, by the appearance of it in the diffraction spot, the damage state of the sample can be specified.

A sample to be subjected to damage measurement can be measured damage even if there is a region that is not in a single crystal state around the sample. For example, in the above-described turbine blade material, a base material of a nickel-based superalloy is covered with a thermal barrier coating (TBC) of 100 micrometers or more. TBC has two-layer configuration consisting of a ceramic layer made of YSZ on the surface side and a polycrystalline alloy layer of Co—Ni on the base material side.

Thus, even if a sample is coated with a polycrystalline coating, its damage can be measured as described below. Thus, even when there is a shield coating on the surface of the sample, by transmitting X-rays to the shield coating of the sample, it is possible to evaluate the damage of the internal metal material in a single crystal state. In particular, it is possible to obtain an effect specially occurred for microbeam X-rays, to measure the damage of the base material through the shield coating of 100 μm or more.

When an attempt is made to measure damages of a metallic material covered with a shield coating such as TBC with X-rays of an about 50 keV, X-rays are absorbed by the coating. In particular, when TBC has a thickness of 100 μm or more and 2000 μm or less, low-energy X-rays are easily shielded. It is possible but inefficient to remove the coating or to use high-energy radiation in a special facility when the degree of damaging to the metallic material just below TBC is measured. There is a need to measure coated samples in a laboratory and nondestructively.

[Principle of Damage Measurement]

Figure 1B:
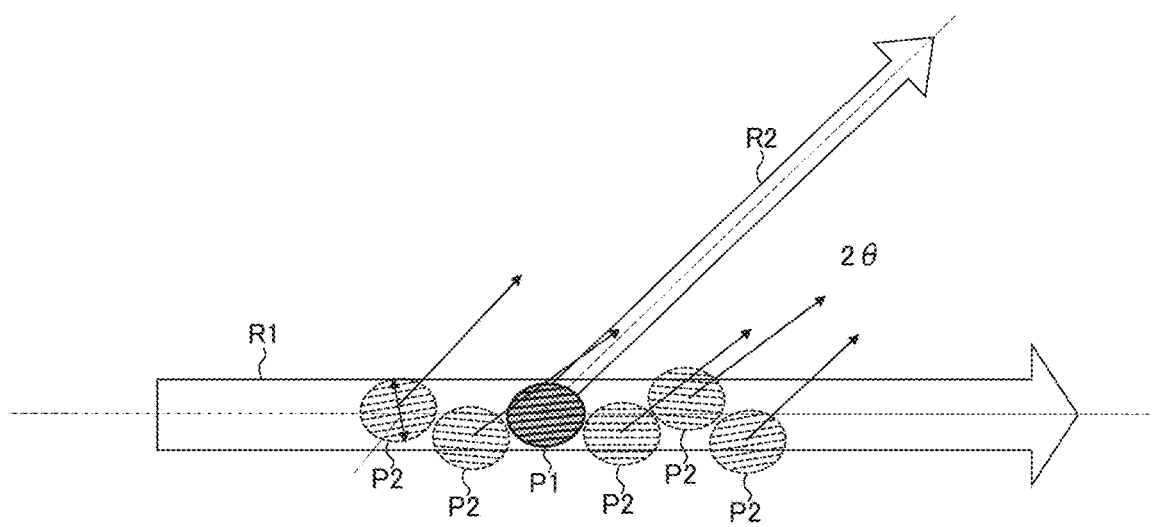

FIGS. 1A and 1B are schematic and enlarged views showing white X-ray diffraction in a sample S0 having a dendritic structure in a single crystal state, respectively. The sample S0 is irradiated with a white X-ray R1 having a microbeam with a low divergence angle of 0.2° or less at a beam width substantially equal to a subcrystalline grain size using the Laue method. The microbeam refers to a beam size equivalent to a subcrystalline grain size to be irradiated with X-rays. The divergence angle of the white X-rays is particularly preferably 0.1° or less. For example, a white X-ray R1 having a beam width of 300 micrometers or less and a divergence angle of 0.1° can be used.

By irradiating X-rays as described above, the number of subcrystalline grains P1 and P2 included in the X-ray path is limited to about several tens from the viewpoint of the transmission ability. For the white X-ray R1 traveling through the sample S0, X-ray diffraction occurs in all subcrystalline grains P1 and P2 present in the path.

However, as shown in FIG. 1B, due to variations in the direction of the subcrystalline grains and variations in the shapes of the subcrystalline grains constituting the subcrystalline grains P1 and P2, the diffracted X-rays R2 differing in orientation and intensity are generated depending on subcrystalline grains P1 contributing to the diffraction. The diffracted X-ray R2 is detected by the X-ray detection section 140. Note that the variation in the orientation of the subcrystalline grains is 5° or less between the adjacent subcrystalline grains and several degrees or less in the entire material. As a result, the number of subcrystalline grains P1 satisfying the diffraction condition is limited to a very small number (1 to 2) in the path (see FIG. 1B).

Thus, by reducing the beam width of the incident X-ray to the same level as the grain size of the subcrystalline grains P1 and P2, further by reducing the divergence angle of the X-ray beam to 0.2° or less, it is possible to limit the number of subcrystalline grains P1 contributing to diffractions in the same direction. As a result, the diffraction spots to be measured become sparse and the numbers of high intensity diffracted X-rays R2 are also reduced, and the diffraction spots are measured as a single and as a peak D1 having constant full width at half maximum. Further, the term "equivalent to a grain size of the subcrystalline grains P1 and P2" means that the beam width is three times or less than a grain size of the subcrystalline grain, and the beam width is preferably two times or less than a grain size of the subcrystalline grains.

In the embodiment shown in FIG. 1A, a high intensity diffracted X-ray R2 is generated from the subcrystalline grains P1 toward the respective $2\theta_1$, $2\theta_2$, $2\theta_3$, and a weak diffracted X-ray R3 which is hardly measurable from the subcrystalline grain P2 is generated. From the diffracted X-ray R2, a peak D1 having a large maximum value is measured, and from the diffracted X-ray R3, a peak D2 having a small maximum value is measured. The attenuator 132 attenuates the intensity of the direct beam and allows the relative position between the direct beam and the diffraction spot to be recognized. The position of the direct beam is specified by the peak D0.

The above measurement may be performed by a transmission method or a reflection method. In the case of the reflection method, the X-rays diffracted by any subcrystalline grains present in the path of the incident X-rays and outgoing from the surface again are measured. The difference between the transmission method and the reflection method is only the difference between the rear surface and the front surface in the direction in which the X-ray is emitted. In fact, in a material having a complicated shape, diffracted X-rays may be emitted from all directions such as the side surface, the upper surface, and the lower surface.

Figure 2:
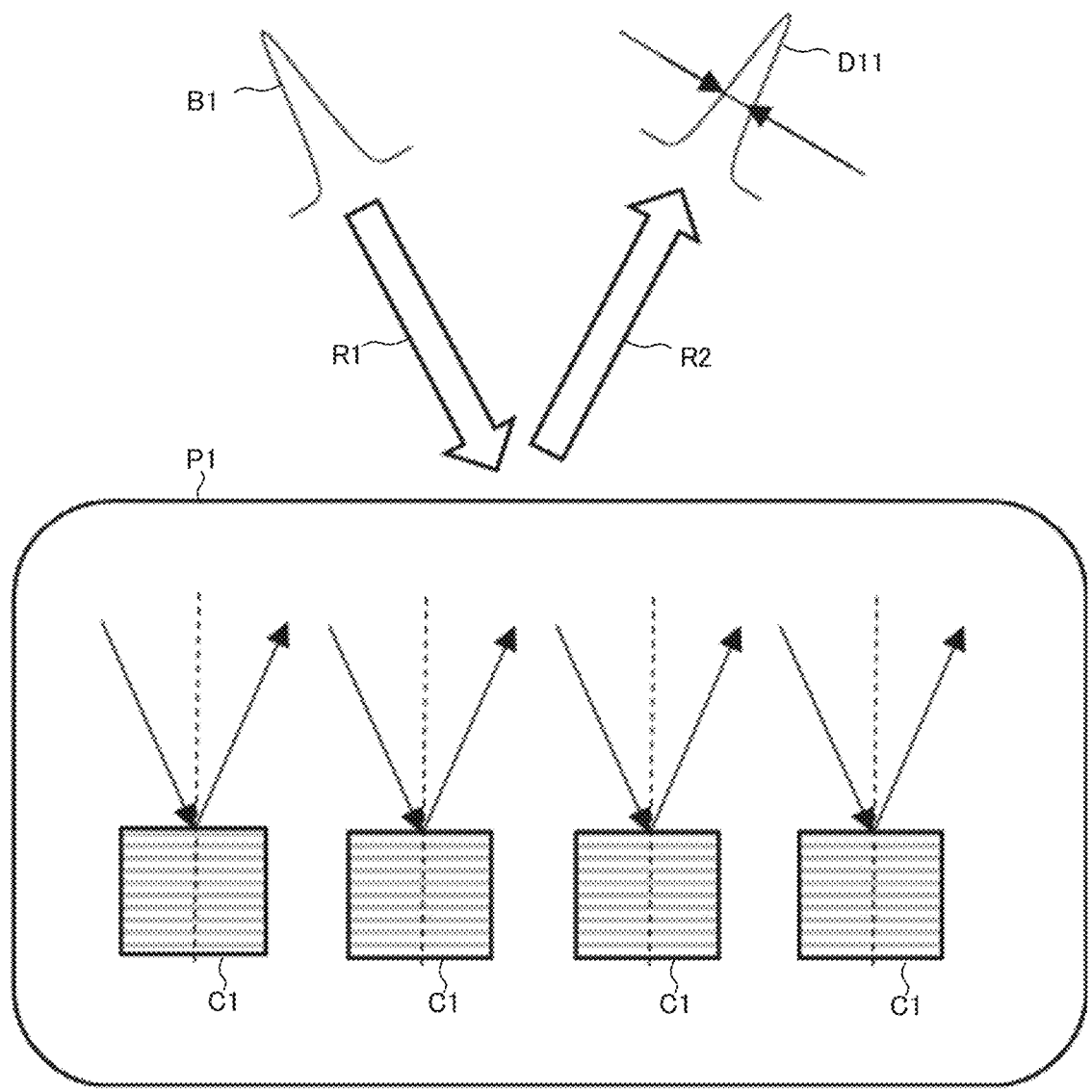
FIG. 2 is a schematic view showing X-ray diffraction by subcrystalline grains without damage.

FIG. 2 is a schematic view showing X-ray diffraction by subcrystalline grains P1 without damage. When a white X-ray R1 having an intensity distribution B1 is irradiated onto the undamaged subcrystalline grains P1, diffracted X-ray R2 is generated by the crystallite C1 in the subcrystalline grains P1, and diffraction peak D11 is obtained.

Figure 3:
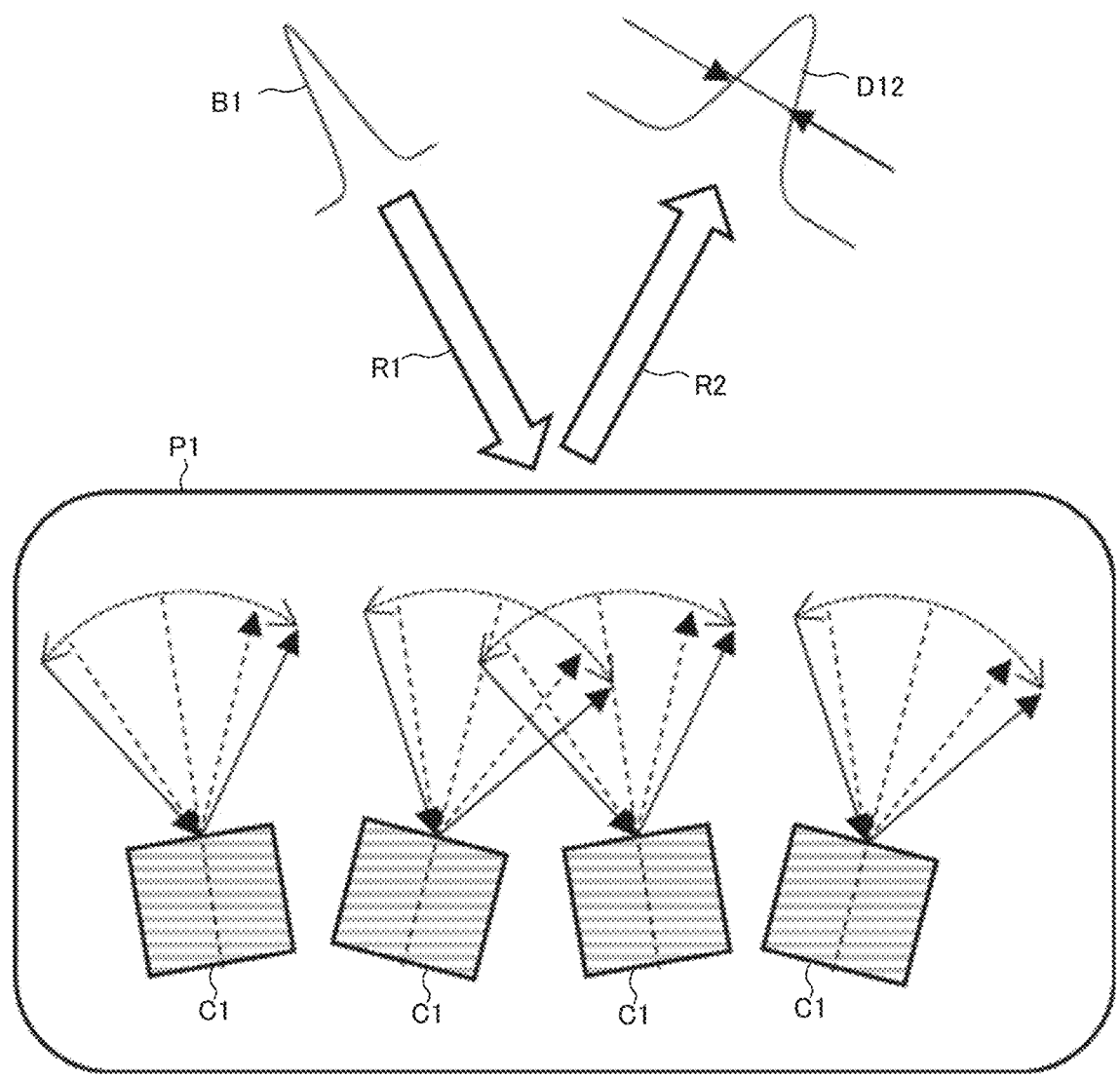
FIG. 3 is a schematic view showing X-ray diffraction by damaged subcrystalline grains.

FIG. 3 is a schematic view showing X-ray diffraction by damaged subcrystalline grains P1. When a white X-ray R1 having an intensity distribution B1 is irradiated onto the damaged subcrystalline grains P1, a diffracted X-ray R2 is generated by the crystallite C1 whose orientation varies in the subcrystalline grains P1 and the lattice plane spacing is slightly widened, and a diffraction peak D12 having a large full width at half maximum is obtained.

When the degree of damage of the metal material is evaluated, the degree of damage is evaluated by the full width at half maximum of the diffraction peak. In the full width at half maximum of the diffraction peak, a phenomenon in which the variation in the orientation of the subcrystalline grains P1 due to the damage of the crystals gets large and a phenomenon in which the lattice plane spacing is slightly widened appear duplicately. Determination of the evaluation objective is important.

Figure 4:
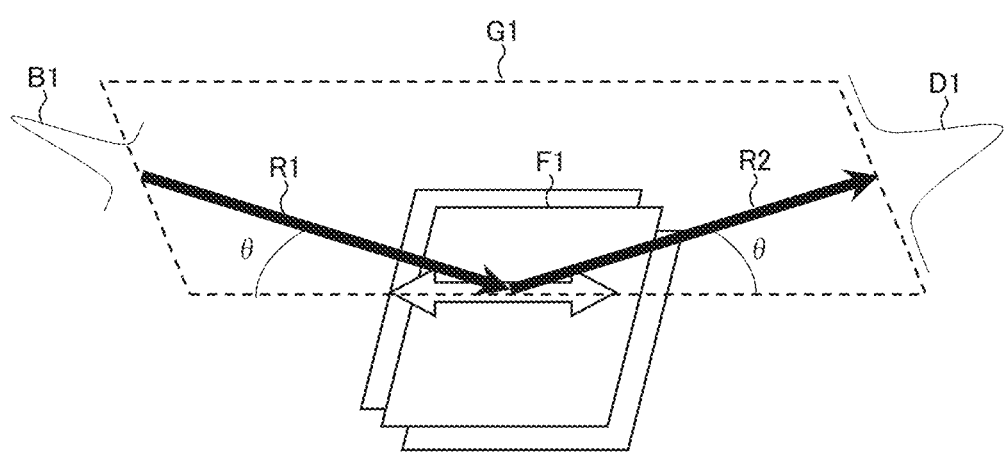
FIG. 4 is a schematic view showing a relationship between a lattice plane of an X-ray and a direction of damage.

FIG. 4 is a schematic view showing a relation between a lattice plane F1 of an X-ray and a direction of damage. As shown in FIG. 4, a white X-ray R1 having an intensity distribution B1 is irradiated onto a sample having a lattice plane F1 at an incidence angle θ, a diffracted X-ray R2 is generated at an exit angle θ, and diffraction peak D1 is measured. The diffraction plane G1 is specified by white X-ray R1 and diffracted X-ray R2.

When X-rays are incident so that a direction parallel to the intersection line between the lattice plane F1 with which the X-rays are diffracted and the diffraction plane G1 coincides with the direction in which the crystals are damaged, the change in the full width at half maximum of the diffraction peak D1 due to the damage is greatest. Therefore, when the degree of damage of a metal material having a dendritic structure in a single crystal state is evaluated, the degree of damage can be evaluated most efficiently using broadening of a diffraction spot oriented in a direction parallel to or close parallel to the damage direction.

Note that the energy of the incident X-ray is determined according to the sample to be irradiated. It is preferable to make X-rays enter the sample with the energy that enables the transmittance to be 1/e or higher when the X-rays transmitted through 7 mm. When there is a coating covering the sample, the energy of the X-ray irradiated from the X-ray irradiation section is adjusted to a numerical value obtained by adding the amount of attenuation by the coating. For example, since the transmittance of Mg sample in the thickness 7 mm is reduced to 1/e with 32.5 keV irradiation, it is possible to set the incident X-ray to be 30 keV or higher.

The relationship between the X-ray energy and the transmittance and the transmission range for the sample is as shown in the following table.

| material | transmission range (mm) at transmittance 1/e, at 150 keV | X-ray transmittance (%) at 150 keV | X-ray transmittance (%) at 100 keV | X-ray energy (keV) at transmittance 1/e |
|---|---|---|---|---|
| Mg | 41.2 mm | 84.4% at 7 mm | 81.4% at 7 mm | 32.5 keV at 7 mm |
| Al | 26.8 mm | 77.0% at 7 mm | 72.4% at 7 mm | 42.1 keV at 7 mm |
| Ti | 13.2 mm | 58.8% at 7 mm | 41.6% at 7 mm | 94.2 keV at 7 mm |
| α Fe | 6.47 mm | 33.9% at 7 mm | 12.9% at 7 mm | 164. keV at 7 mm |
| Ni | 5.09 mm | 25.3% at 7 mm | 6.29% at 7 mm | 198. keV at 7 mm |

The first column of the table indicates the transmission range at which 150 keV X-ray transmittance is 1/e. The second column of the table indicates the transmittance of the X-ray with 150 keV for the sample in thickness 7 mm. Since 1/e is 36.8% in the transmittance, transmitted X-ray with 150 keV at incidence reaches an effective intensity even in heavy metals such as iron and nickel. On the other hand, in the case of the light metals such as magnesium, aluminum, and titanium, transmitted X-ray with 150 keV at incidence are sufficiently within the effective intensity. Note that the crystal system of iron forms a body-centered cubic lattice called αFe at room temperature.

The third column of the table indicates the transmittance of the X-ray with 100 keV for the sample in thickness 7 mm. The X-ray transmittance for iron or nickel samples is much lower than 1/e, but the transmittance for magnesium, aluminum or titanium samples is 1/e or higher, and that means the transmitted X-ray is well within the range of effective intensity. The fourth column of the table indicates the X-ray energy with which the transmittance at 7 mm is 1/e. It can be seen that 100 keV of the X-ray energy is sufficient to measure the sample of magnesium, aluminum or titanium, but 150 keV is required for heavy metal such as iron and nickel. Such data can be used to select the X-ray energy according to the measurement material.

It is preferable that X-rays irradiated onto the metallic material covered with a shield coating such as TBC be with 70 keV or more. When a 50 keV energy of X-rays is irradiated onto a metal material covered with a shield coating such as TBC, all of the X-rays are absorbed by the shield coating, and the crystalline state of the metal structure of the base material cannot be measured. The damage state of the metal structure of the base material can be evaluated by transmitting the X-ray of 70 keV or more through the shield coating.

Figure 5:
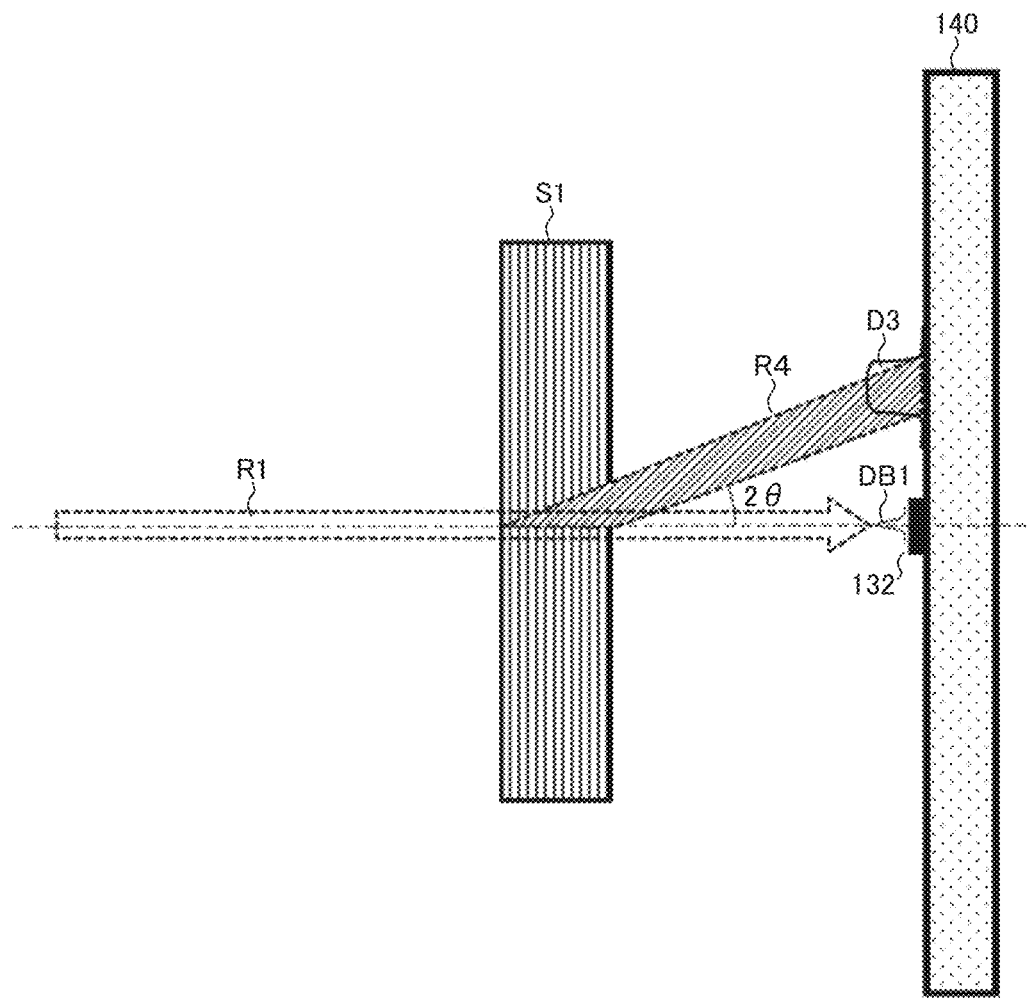
FIG. 5 is a schematic view of an X-ray diffraction and a diffracted X-ray profile for a single crystal material.

For the sample, a single crystal material, a directionally solidified material, or a polycrystalline material can be used. FIG. 5 is a schematic view of an X-ray diffraction and a diffracted X-ray profile for a single crystal material. The sample S1 is not a dendritic structure in a single crystal state, but a conventional single crystal material. For single crystal materials, the deviation of the local crystal orientation in the crystal is order of magnitude smaller than 0.2°. When microbeam white X-rays R1 are irradiated to such a sample S1, a wide diffracted X-ray R4 is generated from the entire X-ray path according to the thickness of the sample S1, and a peak D3 with a large full width at half maximum is observed.

Thus, in the sample S1 of the single crystal material, since the full width at half maximum of the diffraction spot is affected by the thickness of the sample S1, it is difficult to evaluate the crystallinity from the increase of the full width at half maximum. For the above reason, the sample is preferably a metallic material having a dendritic structure. The damage of the sample can be evaluated by irradiating microbeam white X-rays to a limited number of subcrystalline grains in the dendritic structure.

[Configuration of Entire System]

Figure 6:
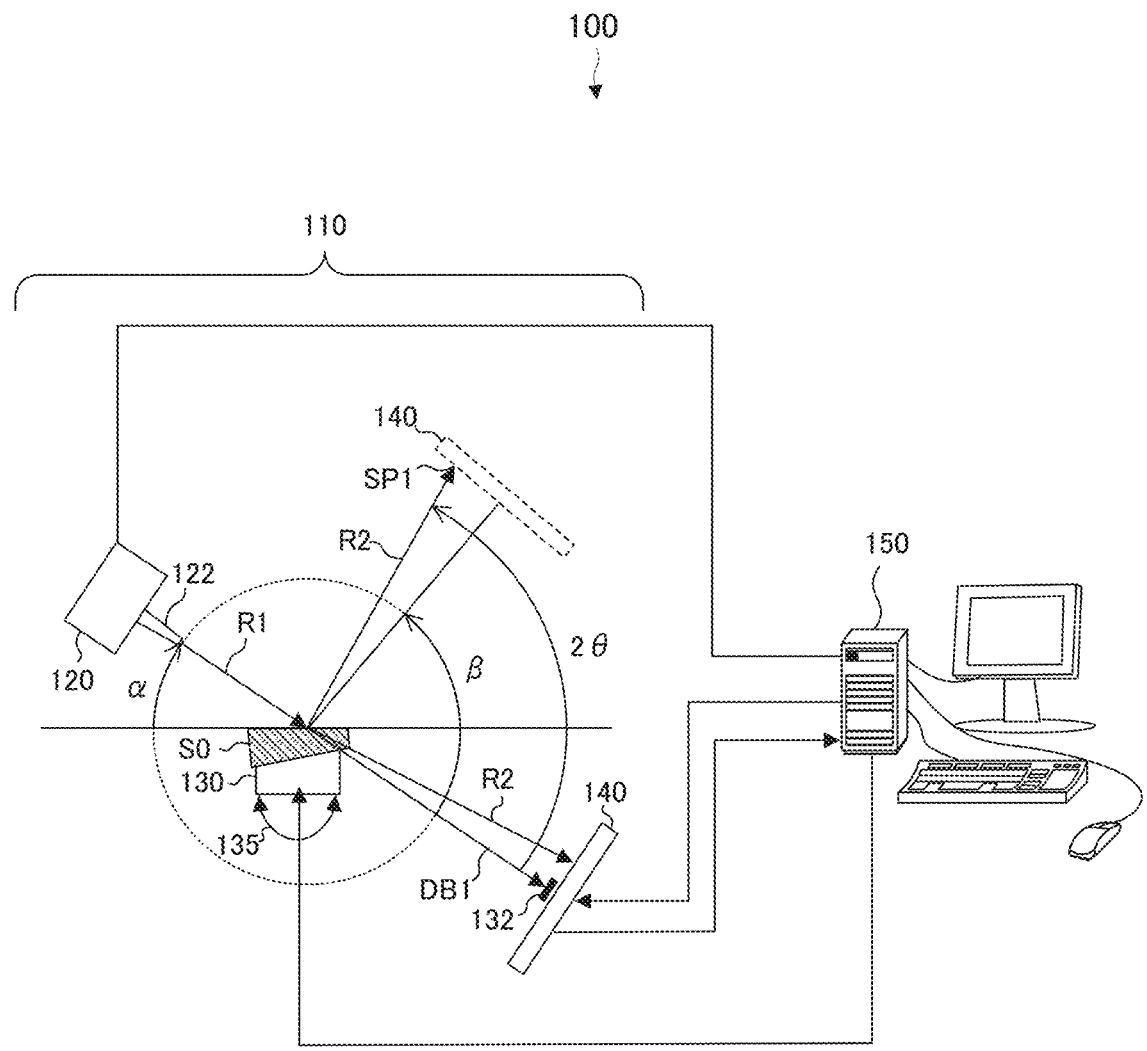
FIG. 6 is a schematic view showing a configuration of a damage measurement system according to the present disclosure.

A system used for damage measurement is described. FIG. 6 is a schematic view showing a configuration of the damage measurement system 100. The damage measurement system 100 includes an X-ray diffraction apparatus 110 and a processing apparatus 150 (damage measurement apparatus). The X-ray diffraction apparatus 110 is an apparatus used for measurement for detecting a diffraction spot. The processing apparatus 150 is an apparatus that mainly specifies a damaged state from the detected diffraction spot. The X-ray diffraction apparatus 110 and the processing apparatus 150 are preferably connected to each other regardless of wired or wireless communication so as to be able to transmit and receive information. Further, the processing apparatus 150 may be placed on a cloud.

[X-Ray Diffraction Apparatus]

Figure 7:
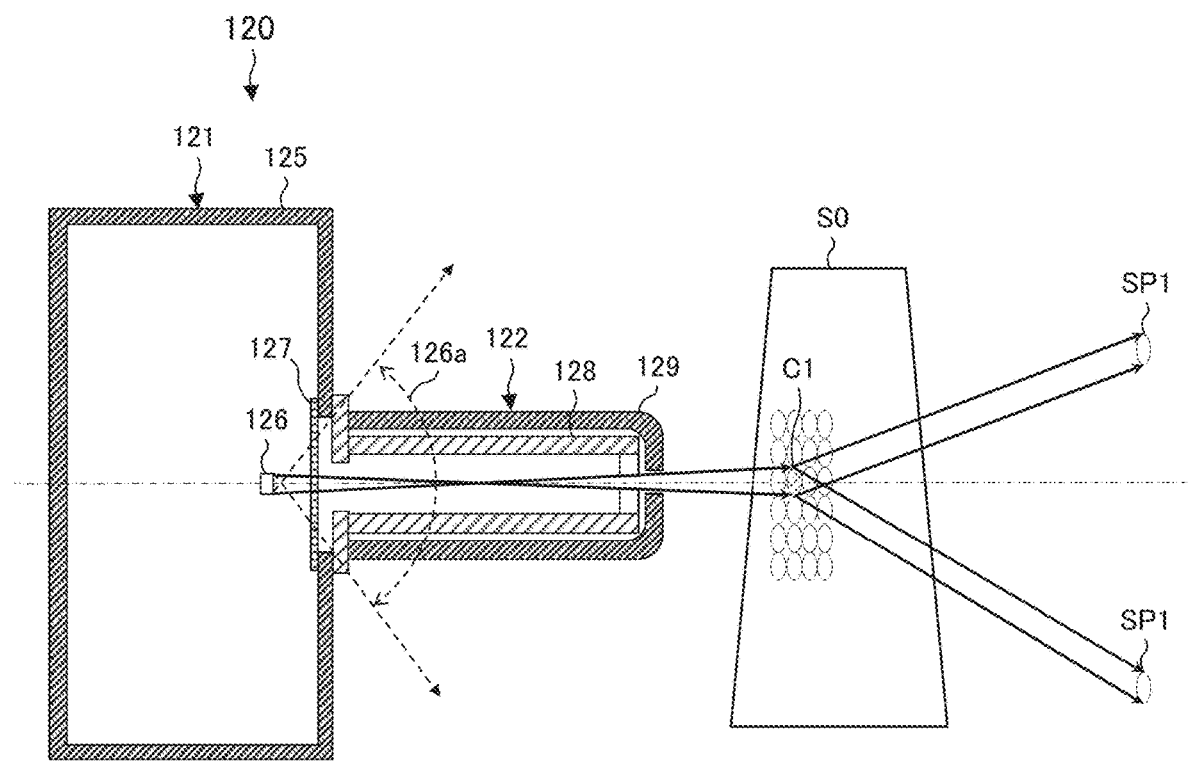
FIG. 7 is a schematic view showing an X-ray irradiation section and a sample.

The X-ray diffraction apparatus 110 comprises an X-ray irradiation section 120, a sample stage 130, a position adjustment mechanism 135, and an X-ray detection section 140. FIG. 7 is a schematic view showing the X-ray irradiation section 120 and the sample S0.

The X-ray irradiation section 120 comprises a main body part 121 and a collimator 122 and generates microbeam white X-rays to irradiate the sample S0. The main body part 121 comprises a housing 125, an X-ray source 126 and an X-ray shield window 127. The X-ray irradiation section 120 is preferably capable of generating white X-rays having a 70 keV or higher.

For the X-ray source 126, a microfocal X-ray target is preferably used, and X-rays generated from the microfocal X-ray target are arranged to be transmitted through the X-ray shield window 127 and emitted to the outside. In order to obtain a white X-ray with 70 keV or higher, as a dedicated configuration that is not available in a typical X-ray diffraction apparatus, it is preferable to adopt a configuration of a wide-area irradiation type X-ray generator used for X-ray transmission imaging and X-ray CT. The X-ray source 126 as described above emits X-rays to the original wide X-ray irradiated area 126a.

It is preferable that the white X-ray beam to be irradiated is adjusted so that the transmittance at the diffraction position is 1/e or higher. By predicting the X-ray intensity required for measurement for the base material protected by the coating with such an indication, it is possible to estimate the remaining life of the sample with high accuracy. The energy required for the incident X-rays for this purpose is described later.

The collimator 122 comprises a collimator main body 128 and a shielding cover 129 and can form a micro X-ray beam. The shielding cover 129 is preferably made of, for example, lead. The collimator 122 is preferably used to adjust the beam size to the size of the subcrystalline grains of the sample. In that case, it is adjusted to the focus size at the sample position. In particular, it is preferable to shape a focal size to 150 μm or more and 500 μm or less at the sample position for the metallic material having a dendrite structure. Thus, the number of subcrystalline grains in the path that X-ray travels through in the sample can be limited to a very small number, and it is possible to measure the damage state of the sample. Further, the collimator 122 can form the divergence angle of the white X-rays to 0.2° or less.

Thus, by reducing the X-ray scattering intensity and limiting to irradiate the micro X-ray beam to a single subcrystalline grains P1 constituting the base material, the diffraction spot SP1 is detected, and the damaged state can be specified. The diffraction spot SP1 can be used to evaluate both the damage degree and direction of the sample simultaneously. From the direction in which the detected diffraction spots SP1 broaden, the direction in which the damages are occurring is recognized.

The sample stage 130 is mounted with a sample as a measurement target to be irradiated with white X-rays and can fix the sample to the X-ray irradiation position with position adjustment. As shown in FIG. 6, the sample stage 130 is configured to be able to adjust its angular position in three axes by a position adjustment mechanism 135.

The position adjustment mechanism 135 makes it possible to adjust the angle of the lattice plane of the sample with respect to the white X-rays to be irradiated. The angular position of the sample can be adjusted by a motor or the like by a control signal from the processing apparatus 150. The incident X-ray R1 emitted from the X-ray irradiation section 120 is diffracted by the sample S0 to generate the diffracted X-ray R2, and a plurality of diffraction spots SP1 are generated in space. The position adjustment mechanism 135 can adjust the angle of the X-ray incident axis from the X-ray irradiation section 120 so that the diffracted X-rays are incident on the X-ray detection section 140. Further, the position adjustment mechanism 135 can adjust the inclination of the sample stage 130. Incidentally, in the case where the synchrotron radiation is used for the white X-ray, the X-ray irradiation section 120 cannot be easily shifted. In such a case, the X-ray irradiation section 120 may be fixed and the position with respect to the sample stage 130 may be adjusted in the direct beam direction.

The lattice plane of the sample S0 is a lattice plane of single crystals in the base material. The Incident X-rays diffract in the sample to produce a plurality of diffraction spot SP1 in space. The position at which the diffraction spot SP1 is generated is determined corresponding to the lattice plane present in the sample S0. The position adjustment mechanism 135 can perform the position adjustment so as to detect a selected one of the diffraction spots generated in the three-dimensional space by diffraction from the sample S0 on the two-dimensional detection surface.

The X-ray detection section 140 generates an electric signal in accordance with the intensity of the X-ray incident on the detection surface. Thus, the diffraction spots generated due to the sample S0 are detected. The X-ray detection section 140 is preferably a two-dimensional detector for easily detecting the shape of the diffraction spot, and in particular, an imaging plate or a semiconductor detector can be used.

At the time of measuring, the diffracted X-rays R2 are detected at various positions of the X-ray detection section 140. In particular, a semiconductor detector is preferred because of their fast readout. The detection surface is preferably flat, but not necessarily flat. The position of the X-ray detection section 140 can be adjusted by a control signal from the processing apparatus 150. Thus, a selected one of the diffraction spots generated in the three-dimensional space from the sample S0 can be detected by the detection surface.

The collimator 122 produces a micro X-ray beam. A wide-area X-ray beam generated by an X-ray source is shaped to generate a micro X-ray beam having a width of several hundred μm or less. Thus, it is possible to irradiate the X-ray limited to a single subcrystalline grain in the sample S0. When the damages are measured for the base material in the turbine blade as a sample, the incident X-rays are transmitted through TBC coated on the surface of the base material in the turbine blade and are focused on the subcrystalline grains, so that diffracted X-rays are generated. The diffracted X-rays generated here are measured by the X-ray detection section 140.

As shown in FIG. 6, the angle of the diffracted X-ray R2 with respect to the incident X-ray R1 can be represented by $2\theta$. The position of the direct beam DB1 of the X-ray is $2\theta=0$. The angle of the X-ray detection section 140 with respect to the sample S0 is represented by $\beta$, and the angle of incidence of the X-rays with respect to the sample S0 is represented by $\alpha$. The incident angle $\alpha$ and the angle $\beta$ of the X-ray detection section 140 are usually fixed, and scanning is not performed during measurement. Therefore, at the time of measurement, the X-ray irradiation section 120, the sample stage 130, and the X-ray detection section 140 are not moved.

Incidentally, in the case where the X-ray irradiation section 120 cannot be easily moved due to using synchrotron radiation for the white X-rays, the X-ray irradiation section 120 may be fixed and its position with respect to the sample stage 130 may be adjusted as a position from the direct beam direction of the X-ray detection section 140.

[Configuration of Processing Apparatus]

Figure 8:
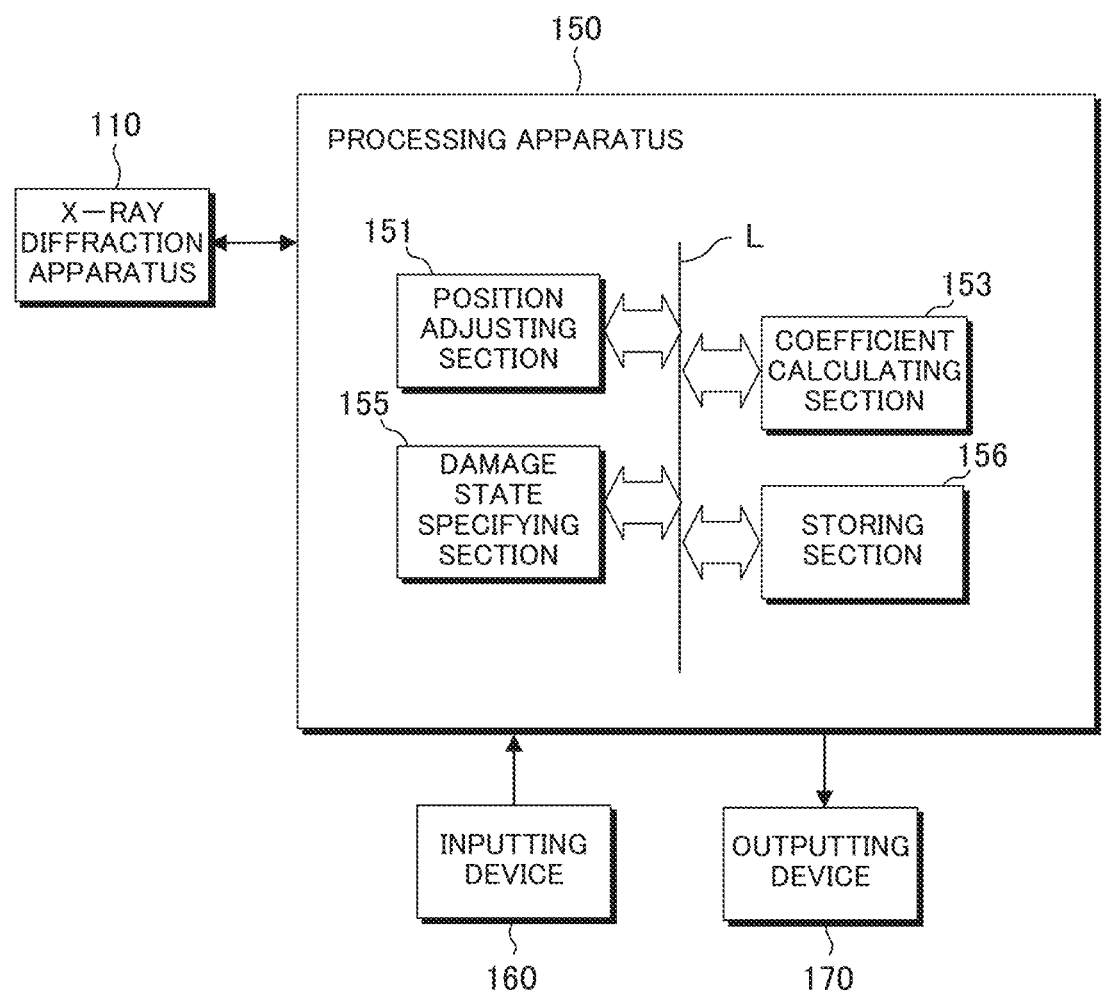
FIG. 8 is a block diagram showing a configuration of a damage measurement apparatus according to the present disclosure.

FIG. 8 is a block diagram showing a configuration of a processing apparatus (damage measurement apparatus) 150. The processing apparatus 150 can be configured by an apparatus such as a PC comprising a CPU and a memory and performs control of the X-ray diffraction apparatus 110 and processing of detected data by executing a program. The processing apparatus 150 comprises a position adjusting section 151, a coefficient calculating section 153, a damage state specifying section 155, and a storing section 156.

The processing apparatus 150 is connected to the inputting device 160 and the outputting device 170. The inputting device 160 is a device that receives an input from a user, such as a mouse, a touch panel, or a keyboard. The outputting device 170 is a device such as a display or a printer.

The processing apparatus 150 performs processing of data and control of the apparatus with respect to input of positional information of the X-ray irradiation section 120, the sample stage 130 and the X-ray detection section 140, input of instruction details from the user, and input of measurement results of the X-ray detection section 140. The processing apparatus 150 outputs the specified damage condition in the sample. The image and the direction in which the peak shape of the acquired diffraction spot are to be viewed may be output.

The position adjusting section 151 adjusts the arrangement of the X-ray detection section 140 with respect to the X-ray irradiation section 120 based on the input information. As a result, the angle adjustment is enabled so that the diffracted X-ray is incident on the X-ray detection section 140 with respect to the incident X-ray from the X-ray irradiation section 120. Specifically, the position angle of the X-ray detection section 140 (p angle or the like) and the angle of the X-ray irradiation section 120 are adjusted.

Further, the position adjusting section 151 can adjust the inclination of the sample stage 130 via the position adjustment mechanism 135. Note that the X-ray irradiation section 120 may be fixed, and the positions of the sample stage 130 and the X-ray detection section 140 may be adjusted.

The coefficient calculating section 153 analyzes the diffraction peak in the $2\theta$ direction and recognizes the degree of the tail broadening of the diffraction peak. Specifically, based on the detection data of the diffraction spot SP1, the coefficient on the variance of the intensity distribution in a particular direction of the diffracted spot SP1 in the detection data is calculated.

The coefficient on the variance of the intensity distribution in a particular direction in the diffraction spot allows specification of the damage state of the sample. The coefficient on the variance of the intensity distribution of the diffraction spot SP1 is preferably a full width at half maximum of the peak in a particular direction. A full width at half maximum means the width of the peak at half the height of the peak.

Although it is the end direction of the turbine blade that the crystal structure of the sample deforms due to the damage, the damage state of the sample can be clearly specified even in the direction perpendicular to the end direction. Note that the direction of the deformation being measured can be specified based on the arrangement of the sample, the position of the incident X-rays with respect to the sample and the position of the diffracted X-rays.

The damage state specifying section 155 specifies the damage state of the sample based on the calculated coefficient. At this time, a function supplied from the storing section 156 is referred to, and a calibration curve as a function between the coefficient on the variance of the intensity distribution in a particular direction in the diffraction spot SP1 and the damaged life consumption rate is used.

The calibration curve is obtained by plotting the damage life consumption rate with respect to the full width at half maximum of each peak using a sample in which the damage life consumption rate is known in advance and drawing an approximate curve with a least squares method. In that case, unreliable data close to breaking can be ignored, and linear approximation can be performed using only data at damage life consumption rate of, for example, 0% to 50%.

Alternatively, the calibration curve need not be a straight line, but may be a curve. By using the obtained calibration curve, the damage life consumption rate of the sample S0 can be determined, and further, the remaining life of the sample S0 can be determined. Thus, it is possible to easily diagnose the damage state of the sample without the angle adjustment work or the like using the 4 axis goniometer having high difficulty.

The damage state of the sample S0 to be specified is preferably a damage life consumption rate calculated from the coefficient on the variance of the intensity distribution of the diffraction spots. Thus, it is possible to specify how long the life remains until it breaks due to the damage deformation.

The storing section 156 stores a function between the coefficient on the variance of the intensity distribution in a specific direction in the diffraction spot and the damage life consumption rate, which have been prepared based on the standard sample. The storing section 156 is referred to when the damage of the sample S0 is evaluated. The storing section 156 supplies a necessary function as appropriate in response to a request from the damage state specifying section 155.

[Damage Measurement Method]

Figure 9:
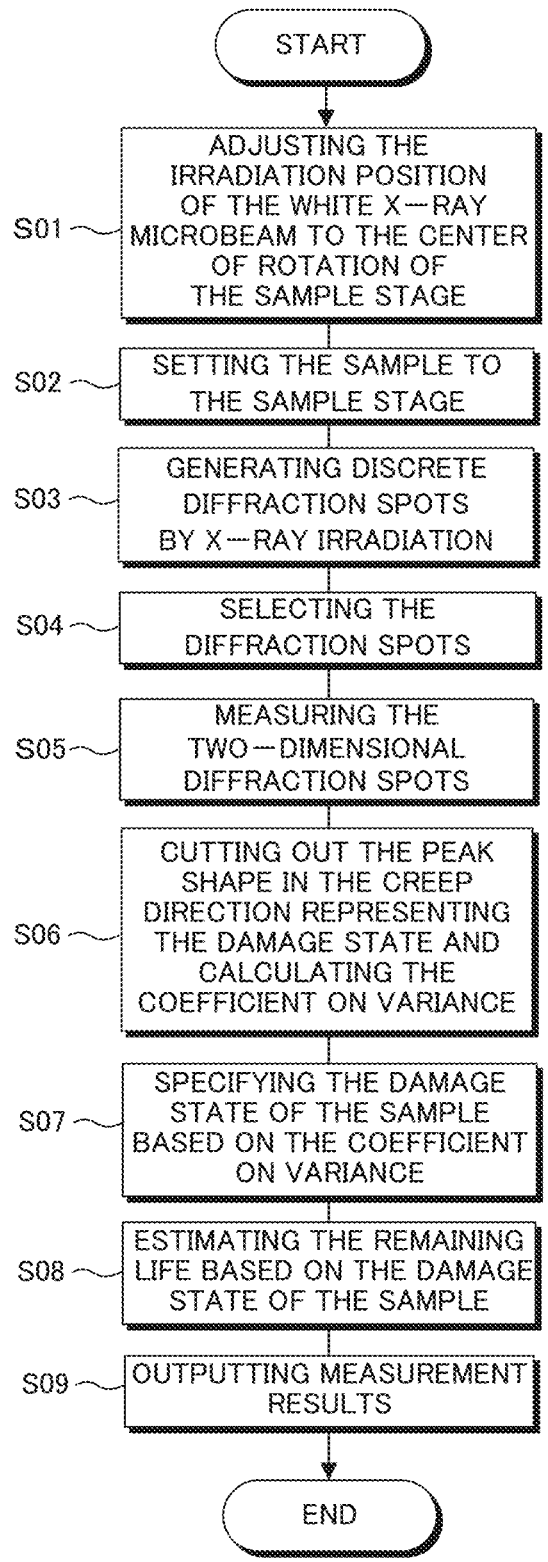
FIG. 9 is a flowchart showing the damage measurement method according to the present disclosure.

A method for diagnosing damage of a sample using the damage measurement system 100 configured as described above is described below. FIG. 9 is a flowchart showing the damage measurement method. First, the white X-ray beam narrowed to a microbeam by the X-ray irradiation section 120 having a collimator with a shielding cover is adjusted to be irradiated to the rotational center position of the sample stage 130 (step S01).

The sample is set on the sample stage 130 (step S02). The sample is, for example, a base material in a single crystal state coated with thermal barrier coating (TBC). At this time, it is preferable to align the damage direction of the sample in a direction parallel to the surface of the sample stage. For example, in the sample S0 cut out from the turbine blade, the direction from the rotational center side of the turbine toward the end side of the blade is the damage direction. When measuring, the sample is placed at an angle of a from the incident X-ray R1. In particular, in the damage measurement method for a metal material having a dendritic structure in a single crystal state, it is preferable that a is set to 90°, and X-rays are incident perpendicularly to the surface of the sample. By setting a to 90°, the elongation rate of each direction can be compared.

In order to reduce the variation in data due to the measurement position, measurement is performed at a plurality of irradiation points in a predetermined region. The distance between the irradiation points is preferably 1 mm or more. It is preferable to calculate an average value by selecting about 6 areas and about 10 spots.

Next, a micro white X-ray beam is transmitted to the sample in a single crystal state to generate discrete diffraction spots (step S03). As the diffraction spot SP1 to be observed, it is preferable to select a diffraction spot on the lower angle side (the lowest angle is about 20° in the reflection method) having a relatively high X-ray intensity (step S04). Note that the lower angle side means 2θ that is 90° or less. If 2θ is 50° or less, it is more preferable as the lower angle side.

After the alignment of the detectors, the diffraction spots can be detected while the equipment of each measurement system remains stationary. By using white X-rays, a large number of high intensity diffraction spots can be detected in an arrangement that sets the detector at a low angle and remains the equipment stationary not rotating regardless of the orientation of the crystal.

However, it is also possible to select a diffraction spot on the higher angle side (for example, 2θ is greater than 90°). In this case, it is possible to measure the X-ray reflected by making the X-ray incident on the sample. Therefore, the configuration of the apparatus can be made compact, and the procedure is simplified.

Next, the shapes of the two-dimensional diffraction spots SP1 due to the X-rays input to the detection surface of the X-ray detection section 140 are measured while the sample S0 remains stationary (step S05). Incidentally, it is preferable to specify the damaged state of the sample on the basis of the diffraction spots by the ten or more lattice planes. Thus, it is possible to accurately evaluate the damage of the sample.

When the sample is irradiated with white X-rays, discrete and regular diffraction spots are generated as Laue spots. For example, nickel-based superalloys have large subcrystalline grains of 0.1 mm, and white X-rays can be irradiated only to 1 or 2 subcrystalline grains by setting the X-ray irradiation area to the same level to the grains for high-precision measuring, for example, by setting the X-ray beams to have $\varphi$ of approximately 0.1 mm.

From each shape of the diffraction spots SP1 measured by the X-ray detection section 140, the peak shape in the damage direction representing the damaged state is cut out, and a factor to be applied to the coefficient on the variance of the intensity distribution is calculated by the data processing (step S06). Note that the direction in which the coefficient on the variance is calculated is the 2θ direction. It is preferred to measure the diffraction spots due to the lattice plane parallel to the side face of the turbine blade.

Next, the damage assessment curve (master curve) stored in the storing section 156 is read out, and the damage state of the sample is specified based on the coefficient on the variance related to the peak shape (step S07). Then, the remaining life is estimated with respect to the damage state of the sample (step S08). The operation is output by a display, a result, or the like (step S09), and the series of processes is ended.

Incidentally, in particular when the reflection method is applied, as the diffraction spot to be detected, the spot at a specific angle that is determined by the diffraction angle according to the white X-ray to be irradiated and the lattice plane in the single crystal of the base material of the sample is preferably selected. The specific angle is preferably 19° or more and 21° or less. As a result, high intensity diffracted X-rays can be measured, and the damage state can be easily specified.

[Energy and Diffraction Intensity of Incident X-Rays]

Figure 10:
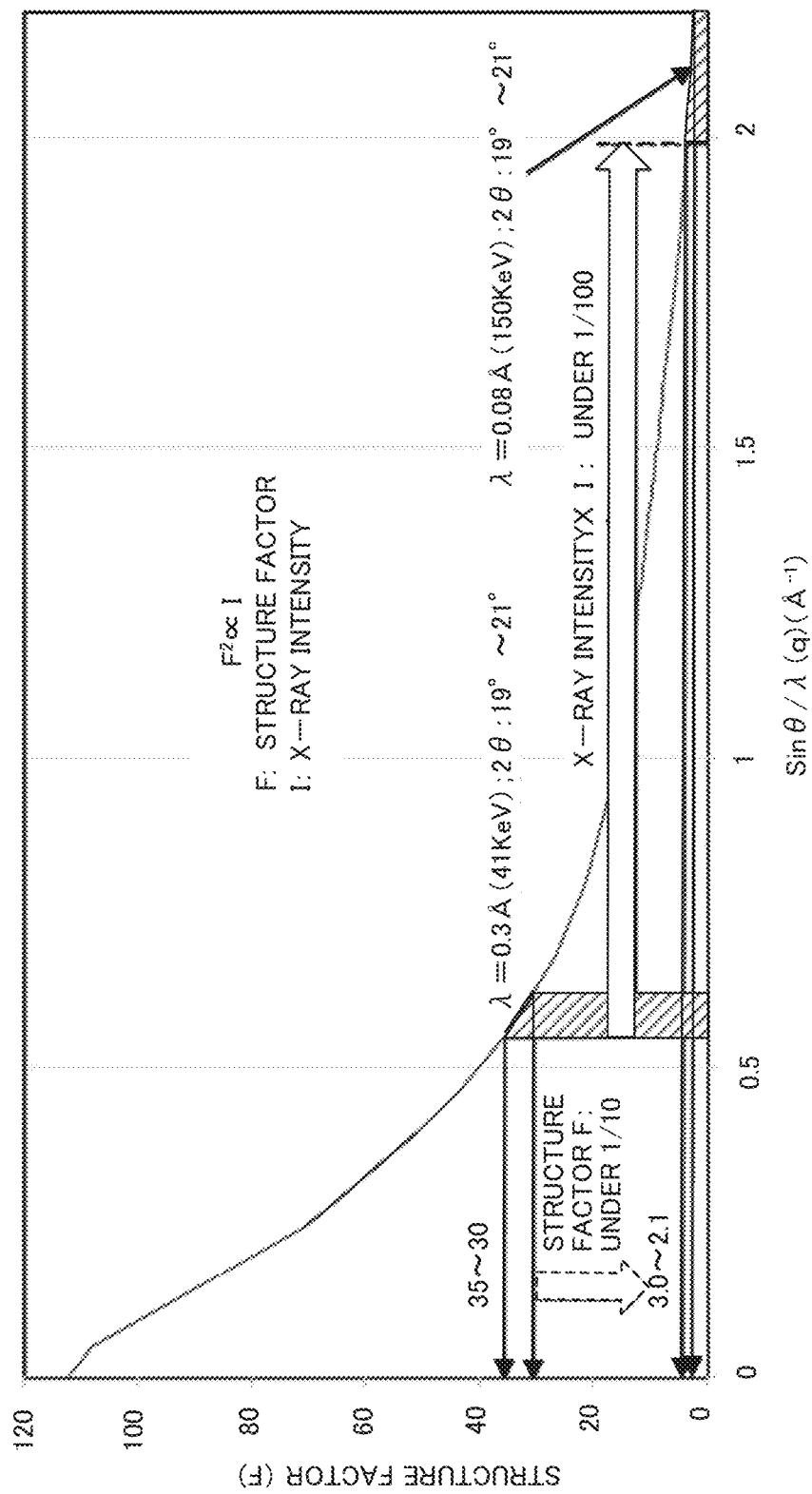
FIG. 10 is a graph showing the q value and the structure factor F in a nickel-based superalloy.

FIG. 10 is a graph showing the q value (=sin θ/μ) and the structure factor F in a nickel-based superalloy. By specifying a particular diffraction angle, the relation between the X-ray energy (=12.4/λ keV, where a unit of A is Å) and the X-ray diffraction intensity ($\propto F^2$) can be recognized from the graph shown in FIG. 10. However, this is an example, and the appropriate energy of the incident X-ray varies depending on the sample.

According to the graph, for the same diffraction range around the diffraction angle of 20°, the structure factor gets less than 1/10 when the X-ray wavelength changes from 0.3 Å (41 keV on the lower energy side) to 0.08 Å (150 keV on the higher energy side). In conventional X-ray diffraction (kinematic theory), since the diffraction intensity is proportional to the square of the structure factor, the diffraction intensity decreases to 1/100 or less due to the change in the wavelength of the X-ray.

Measurement of nickel-based superalloy samples with X-rays 100 keV or higher (λ=0.124 Å or less) reduces the range of structure factors from (35 to 30) to nearly the tail (3 to 2) as compared with measurement with low energy X-rays. That is, it can be seen that the measured intensity ratio is about 1/100 when the measurement is performed around 2θ=20° similarly with the X-ray energy of 100 keV or higher and the X-ray energy of 41 keV to be used in the present embodiment.

Because of this remarkable reduction in diffraction intensity, no significant experimental findings have been reported as a result measuring Laue images using X-rays of 100 keV or higher. On the other hand, crystallization data of the base material can be measured by the reflection Laue method using X-rays having a 100 keV or higher in particular. In order to measure the intensity of weak X-rays decreasing to less than 1/100, it is effective to measure the intensity for a long time in an environment in which the scattered X-rays are extremely suppressed.

As a result, it has been found that a reflection Laue image is observed with about several tens of counts per second by measuring for 10 minutes in the experiment described below. The fit condition of this measurement can also be derived by simulation using a graph as described below.

[Transmittance of Incident X-Rays]

The X-ray transmittance for a sample in a scene to which each of the transmission method and the reflection method is applied is described.

(Transmission Method)

Figure 11:
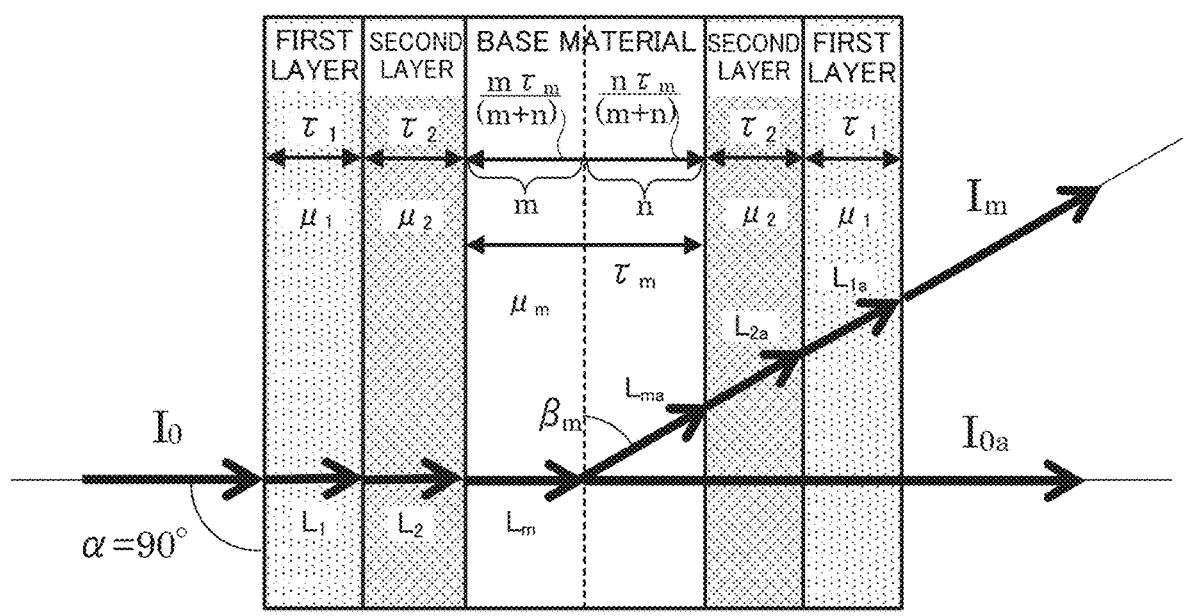
FIG. 11 is a cross-sectional view showing the relationship between the intensity of X-rays and the thickness of a sample with the transmission method.

FIG. 11 is a cross-sectional view showing the relationship between the intensity of X-rays and the thickness of a sample in the transmission method. In FIG. 11, there is the following relationship between the incident X-ray and the diffracted X-ray.

$$I_m = I_0 e^{-(\mu_1 \tau_1 + \mu_2 \tau_2)(1+1/\sin \beta m)+(\mu_m \tau_m)[m/(m+n)+n/\{(m+n)\sin \beta m\}]} \quad (1\text{-}1)$$

$$L_1 = \tau_1, L_{1a} = \tau_1/\sin \beta_m \quad (1\text{-}2)$$

$$L_2 = \tau_2, L_{2a} = \tau_2/\sin \beta_m \quad (1\text{-}3)$$

$$L_m = m\tau m/(m+n), L_{ma} = n\tau m/\{(m+n)\sin \beta_m\} \quad (1\text{-}4)$$

In the embodiment shown in FIG. 11, a sample in which two layers of coatings (the first layer of TBC is YSZ, and the second layer is Co alloy) are laminated is irradiated with X-rays. The same coating layers are laminated on the front and back surfaces of the sample in the same order from the respective surfaces, and X-rays are incident from the surface of the sample at an intensity I0 and an incident angle α (=90°). Then, it is assumed that the X-rays of the intensity $I_m$ diffract at the emission angle β m at the position where the sample thickness $\tau_m$ is divided into m:n in the depth direction from the X-ray incident direction.

The transmittance $I_m/I_0$ of the X-ray intensity can be obtained by solving Equation (1-1). For the thickness $\tau_1$ of the first layer and $\tau_2$ of the second layer, the linear absorption coefficient $\mu_1$, $\mu_2$ and $\mu_m$ of each layer with respect to the energy of the incident X-ray can be used.

Based on this principle, the transmittance ($I_m/I_0$) for X-ray energy is calculated to estimate the energy and X-ray intensity required for measuring the nickel-based superalloy of TBC protected base material. As a result, the remaining life of the sample can be estimated with high accuracy.

(Reflection Method)

Figure 12:
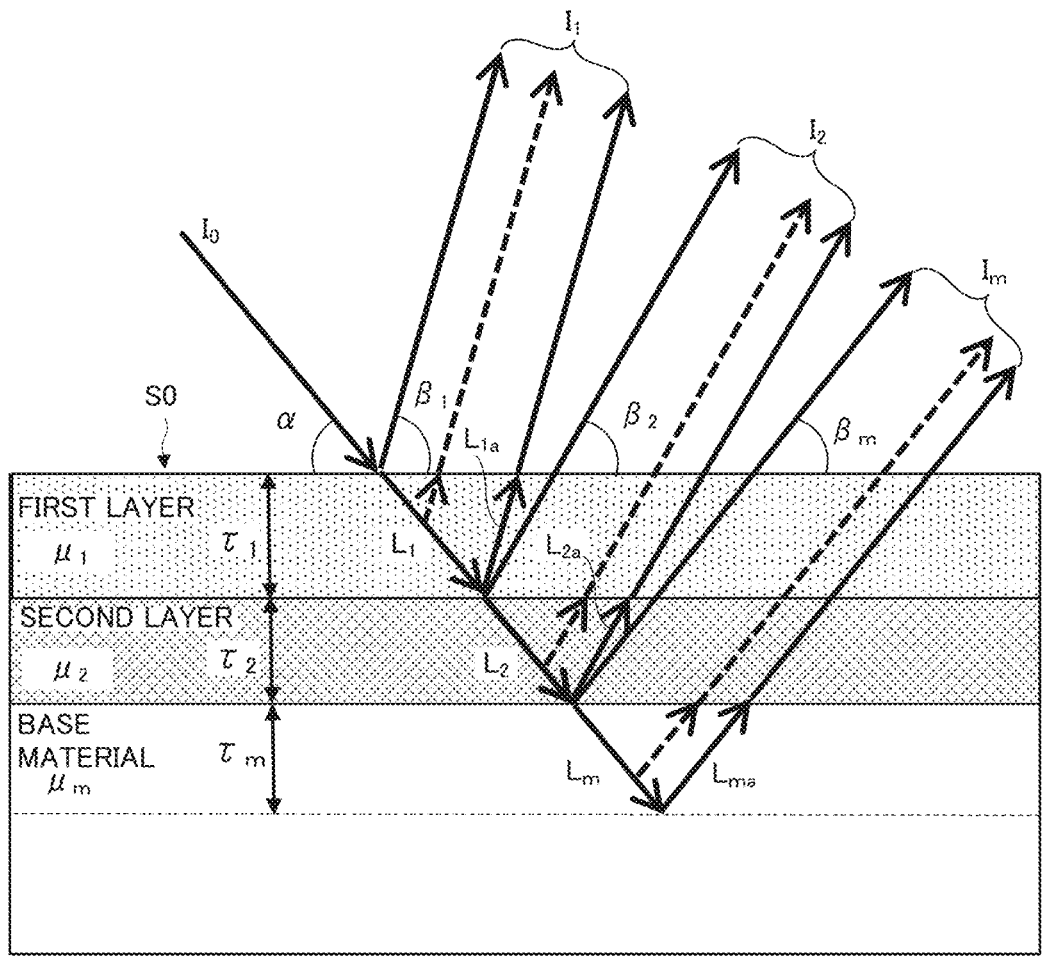
FIG. 12 is a cross-sectional view showing the relationship between the intensity of X-rays and the penetration depth for a sample with the reflection method.

FIG. 12 is a cross-sectional view showing the relationship between the intensity of X-rays and the penetration depth for a sample in the reflection method. In FIG. 12, there is the following relationship between the incident X-ray and the diffracted X-ray.

$$I_1 = I_0 e^{-\mu_1 \tau_1 (1/\sin \alpha + 1/\sin \beta 1)}, I_2 = I_0 e^{-(\mu_1 \tau_1 + \mu_2 \tau_2)(1/\sin \alpha + 1/\sin \beta 2)},$$
$$I_m = I_0 e^{-(\mu_1 \tau_1 + \mu_2 \tau_2 + \mu_m \tau_m)(1/\sin \alpha + 1/\sin \beta_m)} \quad (2\text{-}1)$$

$$L_1 = \tau_1/\sin \alpha, L_{1a} = \tau_1/\sin \beta_1 \quad (2\text{-}2)$$

$$L_2 = \tau_2/\sin \alpha, L_{2a} = \tau_2/\sin \beta_2 \quad (2\text{-}3)$$

$$L_m = \tau_m/\sin \alpha, L_{ma} = \tau_m/\sin \beta_m \quad (2\text{-}4)$$

In the embodiment shown in FIG. 12, a sample in which two layers of coatings (the first layer of TBC is YSZ, and the second layer is Co alloy) are laminated is irradiated with X-rays. The X-rays incident at the intensity I0 and the incident angle α are diffracted by the first layer, the second layer, and the base material at the emission angles $\beta_1$, $\beta_2$ and $\beta_m$ and at the X-ray intensity $I_1$, $I_2$, and $I_m$, respectively.

The X-ray penetration depth $\tau_m$ when the transmittance ($I_m/I_0$) of the X-ray intensity decreases to 1/e can be obtained by solving Equation (1). To the coating thicknesses $\tau_1$ of the first layer and $\tau_2$ of the second layer, the linear absorption coefficients $\mu_1$, $\mu_2$ and $\mu_m$ of the respective layers for the energy of the incident X-ray can be used.

Based on this principle, the transmittance ($I_m/I_0$) for X-ray energy is calculated to estimate the energy and X-ray intensity required for measuring the nickel-based superalloy of the base material protected by TBC. As a result, the remaining life of the sample can be estimated with high accuracy.

[Diffraction Intensity of Polycrystalline]

Figure 13:
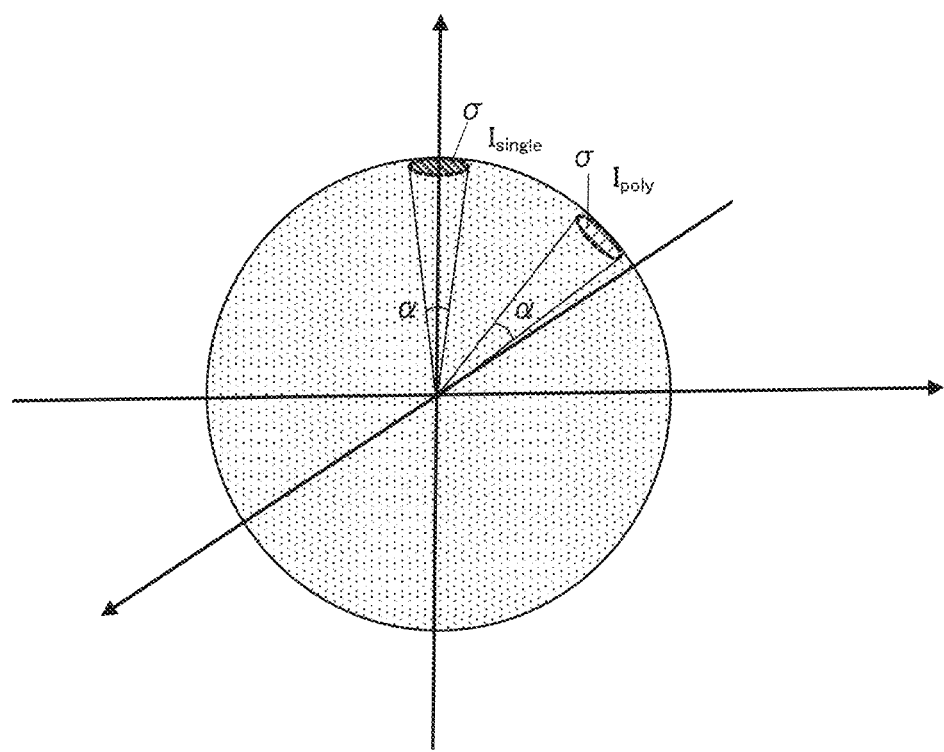
FIG. 13 is a schematic view showing diffraction intensities of a single crystal sample and a polycrystalline sample of nickel for each diffracted X-ray solid angle σ.

FIG. 13 is a schematic view showing diffraction intensities of a single crystal sample and a polycrystalline sample of nickel for each diffracted X-ray solid angle σ. For example, the X-rays detected from a sample of a nickel-based superalloy of a base material protected with TBC include X-rays diffracted by a coating. The base material of the sample is in a single crystal state, but the coating is polycrystalline. As shown in FIG. 13, the diffraction intensity $I_{poly}$ of the polycrystal (fcc) is expressed by the following formula with the diffraction X-ray solid angle σ.

$$I_{poly} = I_{single} \times \sigma/4\pi$$

For example, when the scattering angle σ=0.5°, the diffracted X-ray intensity of the (111) reflection in the polycrystalline sample is as follows.

$$I_{poly} = 1.45 \times 10^{-4} \times I_{single} \text{(multiplicity 48)}$$

In general, there is one crystallite that contributes to diffraction in a single crystal sample, but there are numerous crystallites that contribute to diffraction in a polycrystal sample. Therefore, when the diffraction intensity for the solid angle $\sigma_{single}$ of one diffracted X-ray from a single crystal sample as shown in FIG. 13 is expressed as a $I_{single}$, the diffracted X-ray intensity of the X-ray observed within the same solid angle in the polycrystal sample becomes about $1.5 \times 10^{-4}$ times smaller by an order of magnitude than that of the single crystal sample even by the reflection surface (111) with the highest multiplicity of 48.

For turbine blades, TBC layers are composed of polycrystalline materials such as YSZ and Co—Ni alloy. The intensity of diffracted X-rays by YSZ is about 500 times that by Ni, and the intensity of diffracted X-rays by Co—Ni alloy is equivalent to that by Ni.

The diffracted X-ray intensity from the polycrystalline sample constituting TBC is orders of magnitude smaller than the diffracted X-ray intensity of the nickel single crystal sample of the base material. Therefore, the contrast of the X-ray intensity between the Laue image from nickel single crystals at 100 micrometers or more below the surface and the Debye-Scherrer ring from the TBC is very large. Therefore, the Laue image from the base material below the TBC layer is clearly observed.

Example 1

Figure 14:
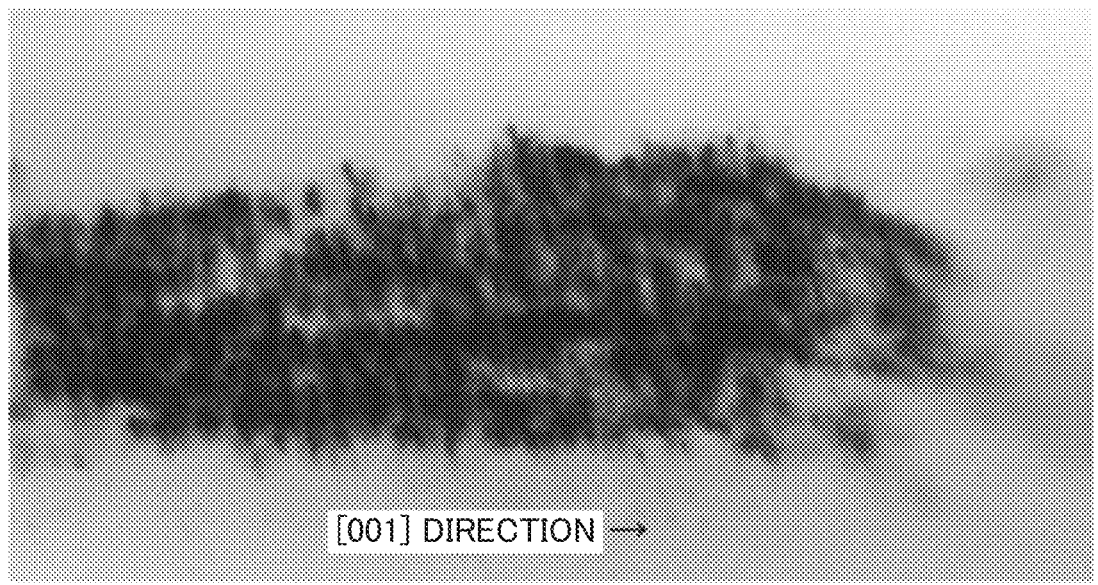
FIG. 14 is a topographical image of boundaries of subcrystalline grains constituting a dendritic structure of directionally solidified material.

A topographical image of the nickel-based superalloy forming directionally solidified material was obtained. FIG. 14 is a topographical image of boundaries of subcrystalline grains constituting a dendritic structure of directionally solidified material. As shown in FIG. 14, subcrystalline grains are generated in a crystal having a dendritic structure. In the image shown in FIG. 14, the arrow [001] indicates a direction of orientations, and numerous single crystal subcrystalline grains appear as black spots in the dendritic structure.

Example 2

Using a nickel-based superalloy material of a single crystal block composed of dendritic structure with subcrystalline grains of about several hundred μm in grain size as a sample, the diffraction spot was measured by the optical system based on the Laue method. Non-damaged samples respectively with five-step thickness of 1 mm, 2 mm, 3 mm, 5 mm and 7 mm were prepared.

When the microbeam white X-rays with 100 keV or higher having divergence angles less than 0.2° were shaped into a beam width of several hundred micrometers equivalent to the sizes of the subcrystalline grains and irradiated to the sample, a plurality of single peak diffraction spots appeared. According to the appearance of the diffraction spot, it was confirmed that the number of subcrystalline grains satisfying the diffraction condition in the X-ray path was limited to a very small number (1 to 2).

Figure 15:
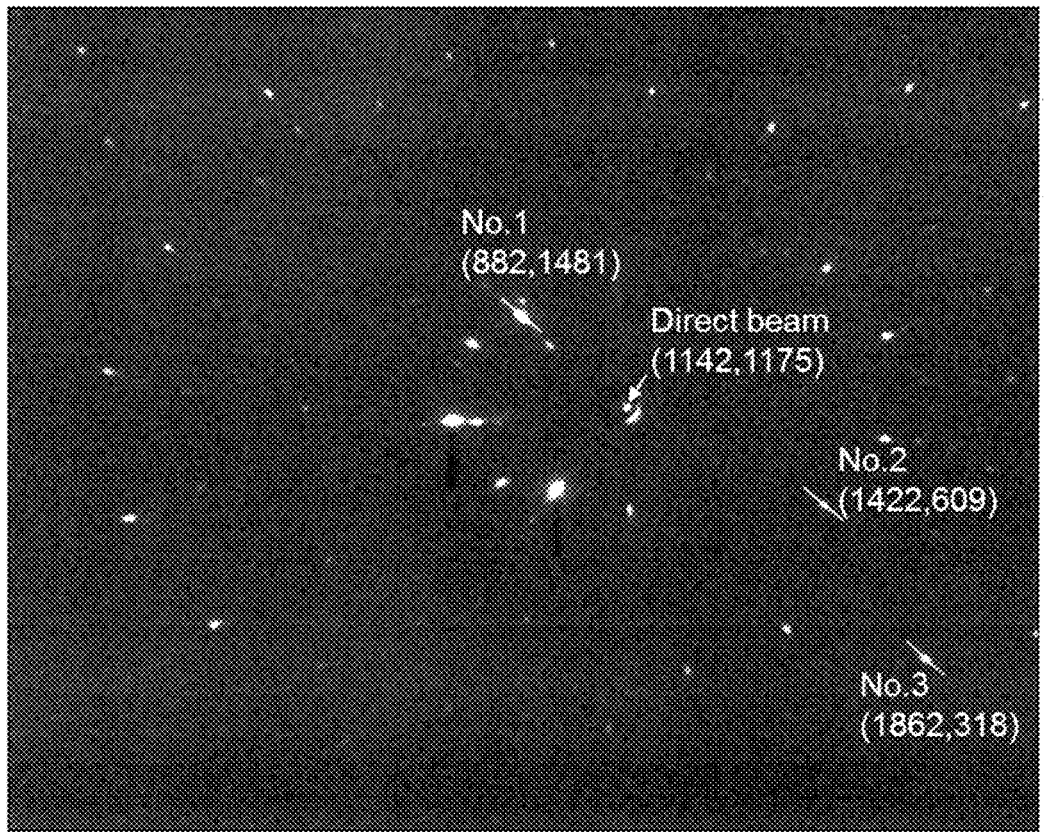
FIG. 15 is a view showing a Laue image measured in a block material in a single crystal state in the thickness of 1 mm.
Figure 16A:
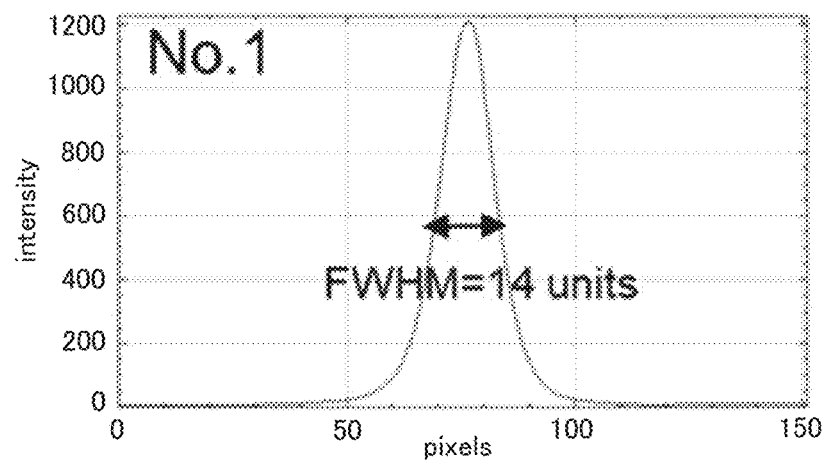
FIGS. 16A, 16B, and 16C are views showing profiles of diffraction spots in FIG. 15, respectively.
Figure 16B:
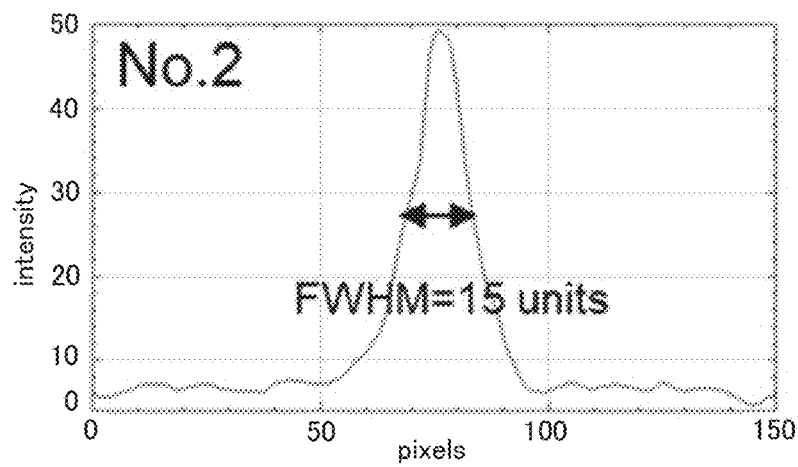
Figure 16C:
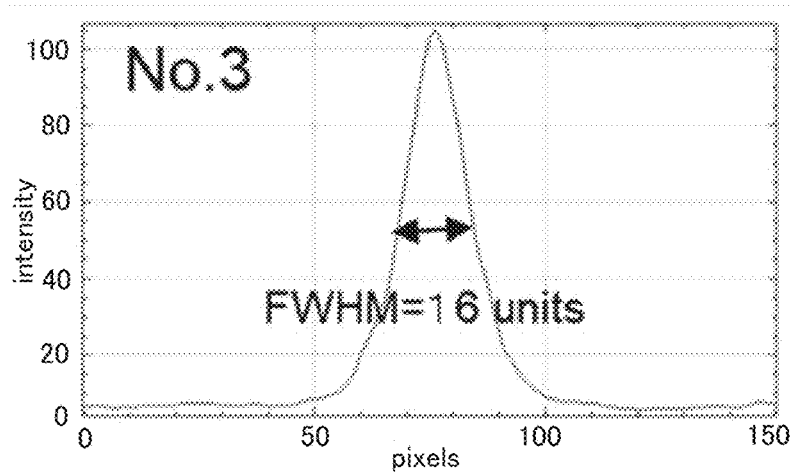

FIG. 15 is a view showing a Laue image measured in a blocked material in a single crystal state in the thickness of 1 mm. FIGS. 16A to 16C are views showing profiles of diffraction spots No. 1 to 3 in FIG. 15, respectively.

Figure 17:
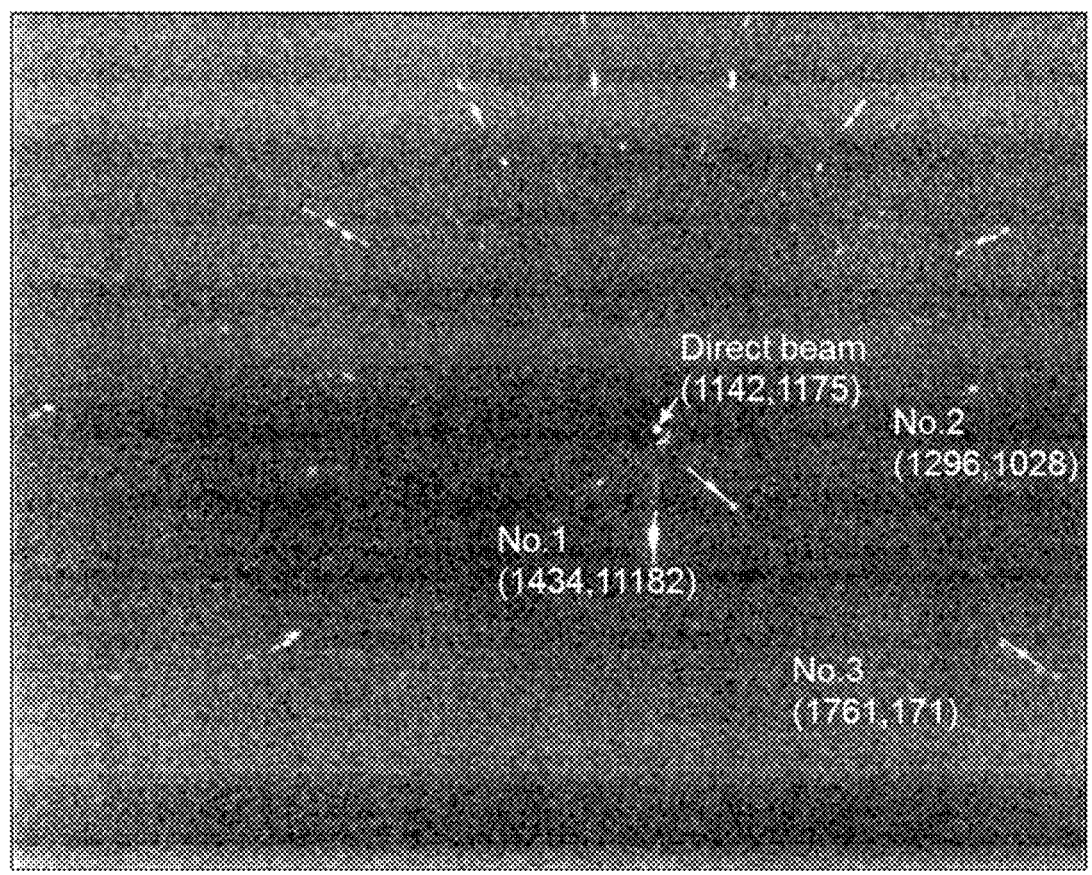
FIG. 17 is a view showing a Laue image measured in a block material in a single crystal state in the thickness of 2 mm.
Figure 18A:
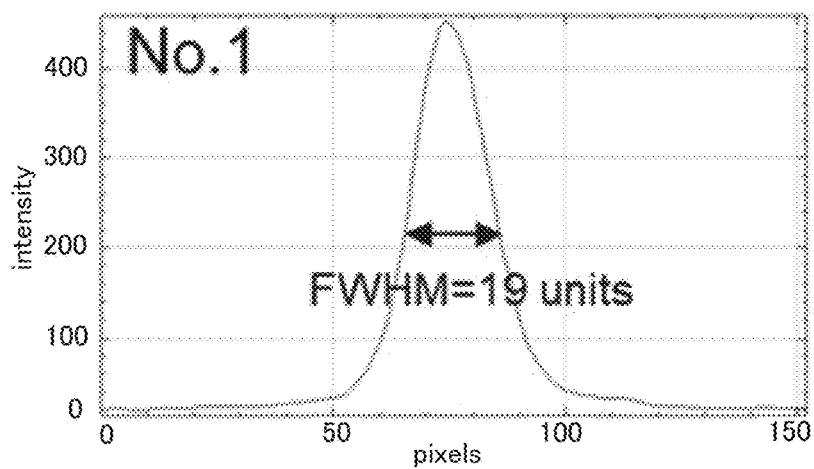
FIGS. 18A, 18B, and 18C are views showing diffractive profiles of the spots in FIG. 17, respectively.
Figure 18B:
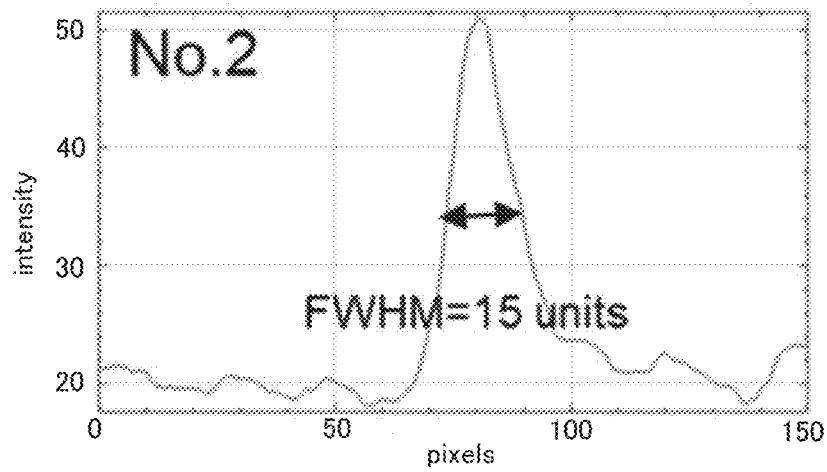
Figure 18C:
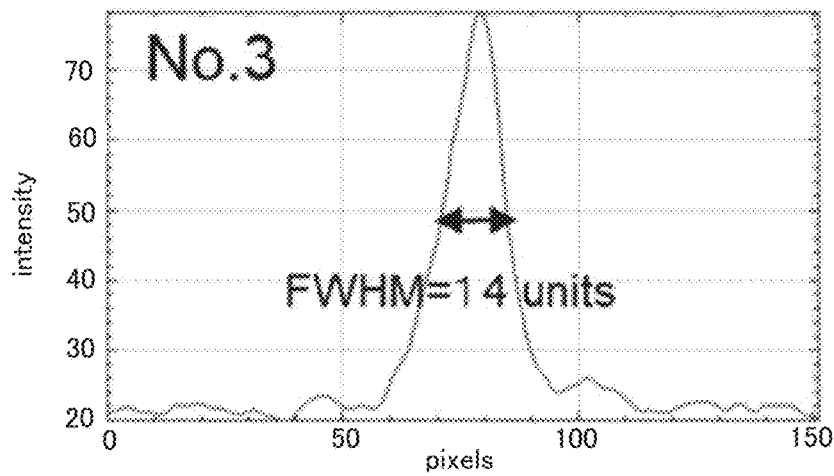

FIG. 17 is a view showing a Laue image measured in a blocked material in a single crystal state in the thickness of 2 mm. FIGS. 18A to 18C are views showing profiles of diffraction spots No. 1 to 3 in FIG. 17, respectively.

Figure 19:
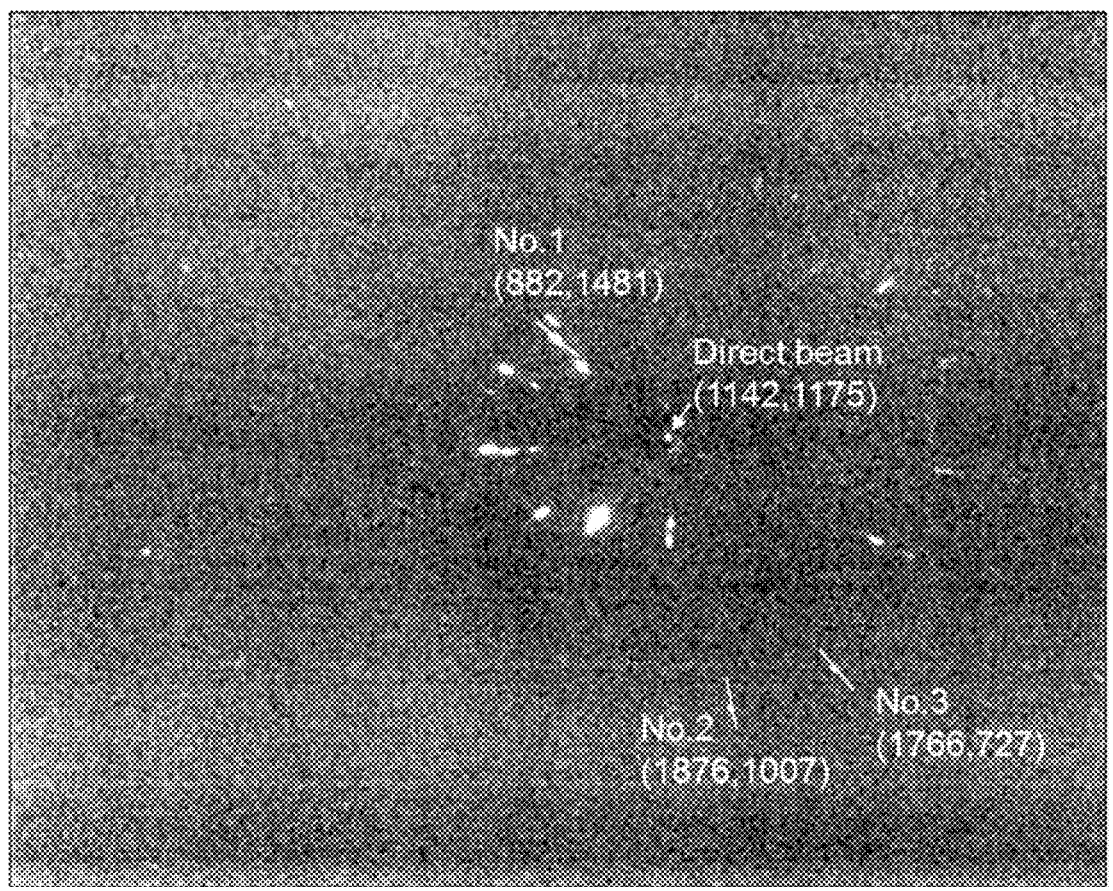
FIG. 19 is a view showing a Laue image measured in a blocked material in a single crystal state in the thickness of 3 mm.
Figure 20A:
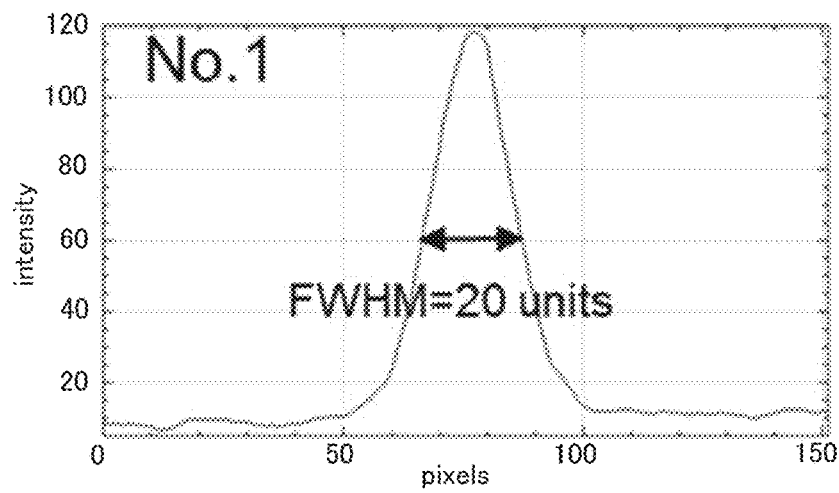
FIGS. 20A, 20B, and 20C are views showing profiles of diffraction spots in FIG. 19, respectively.
Figure 20B:
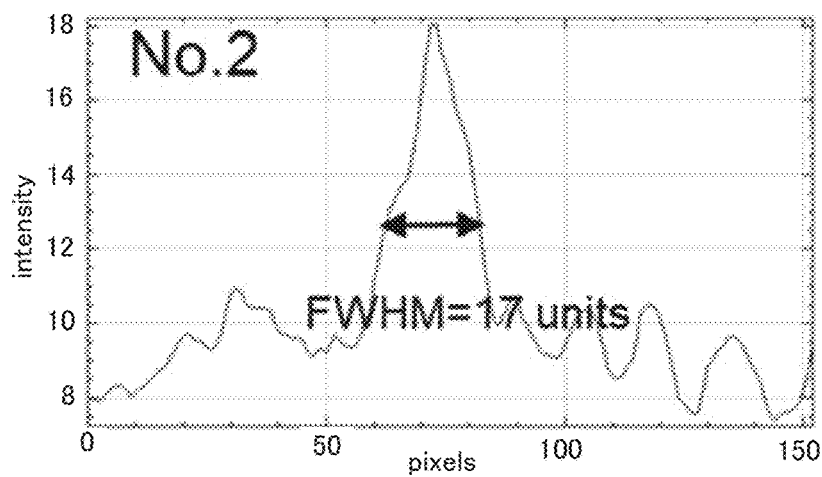
Figure 20C:
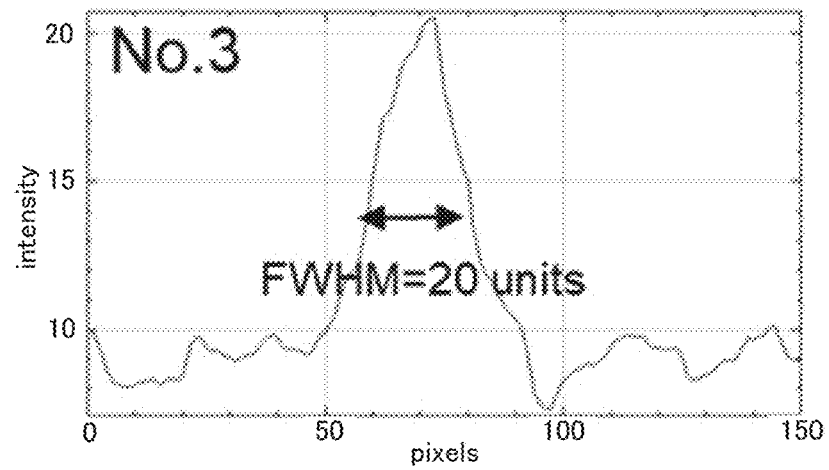

FIG. 19 is a view showing a Laue image measured in a blocked material in a single crystal state in the thickness of 3 mm. FIGS. 20A to 20C are views showing profiles of diffraction spots No. 1 to 3 in FIG. 19, respectively.

Figure 21:
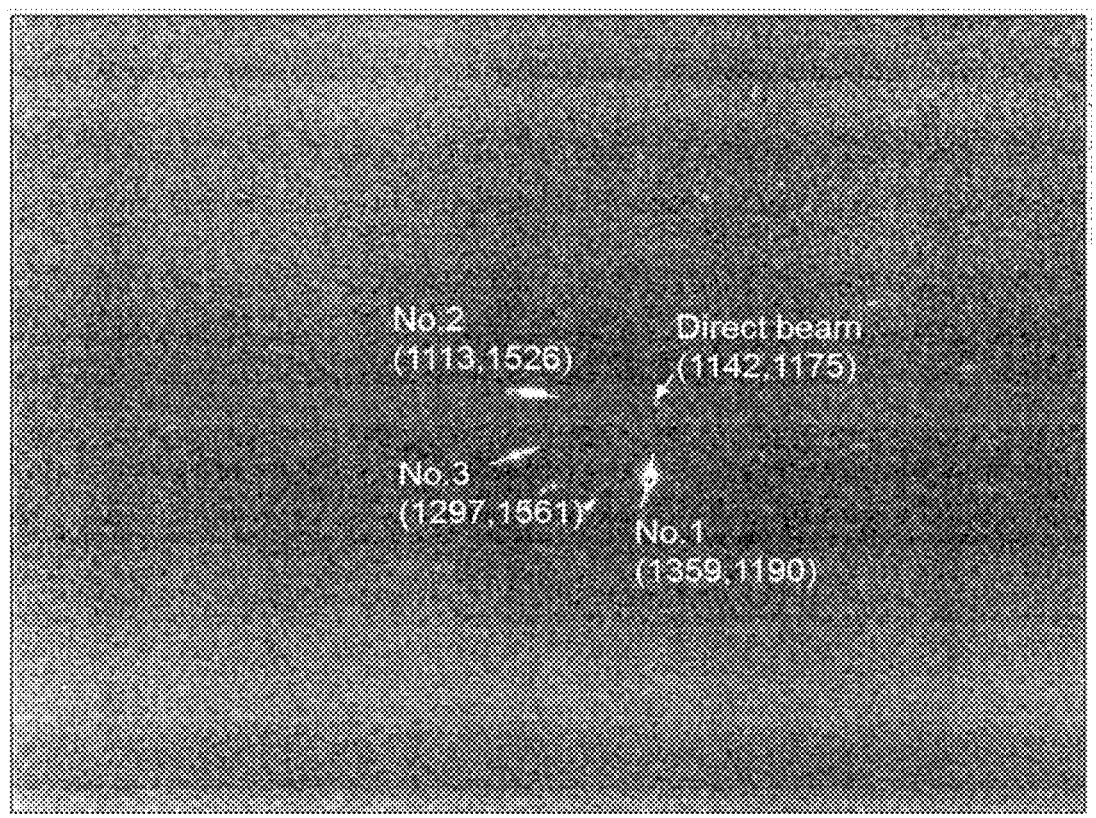
FIG. 21 is a view showing a Laue image measured in a blocked material in a single crystal state in the thickness of 5 mm.
Figure 22A:
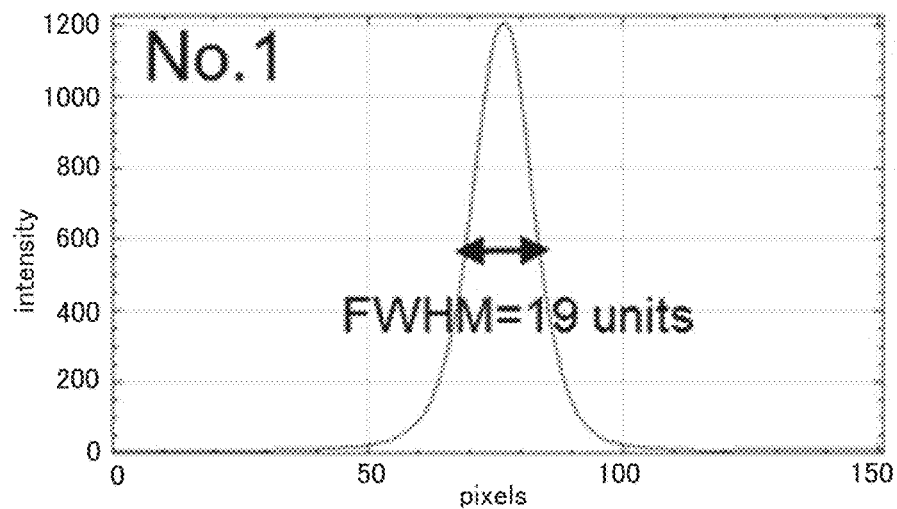
FIGS. 22A, 22B, and 22C are views showing profiles of the diffraction spots in FIG. 21, respectively.
Figure 22B:
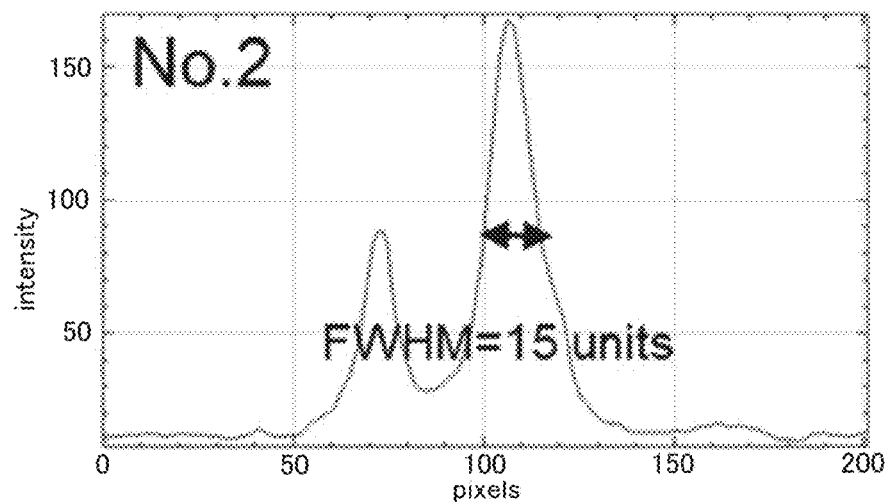
Figure 22C:
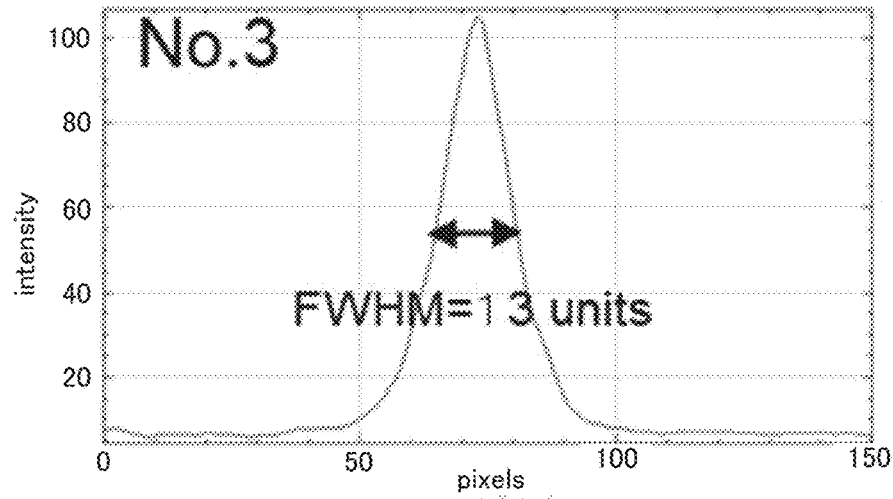

FIG. 21 is a view showing a Laue image measured in a blocked material in a single crystal state in the thickness of 5 mm. FIGS. 22A to 22C are views showing profiles of the diffraction spots No. 1 to 3 in FIG. 21, respectively.

Figure 23:
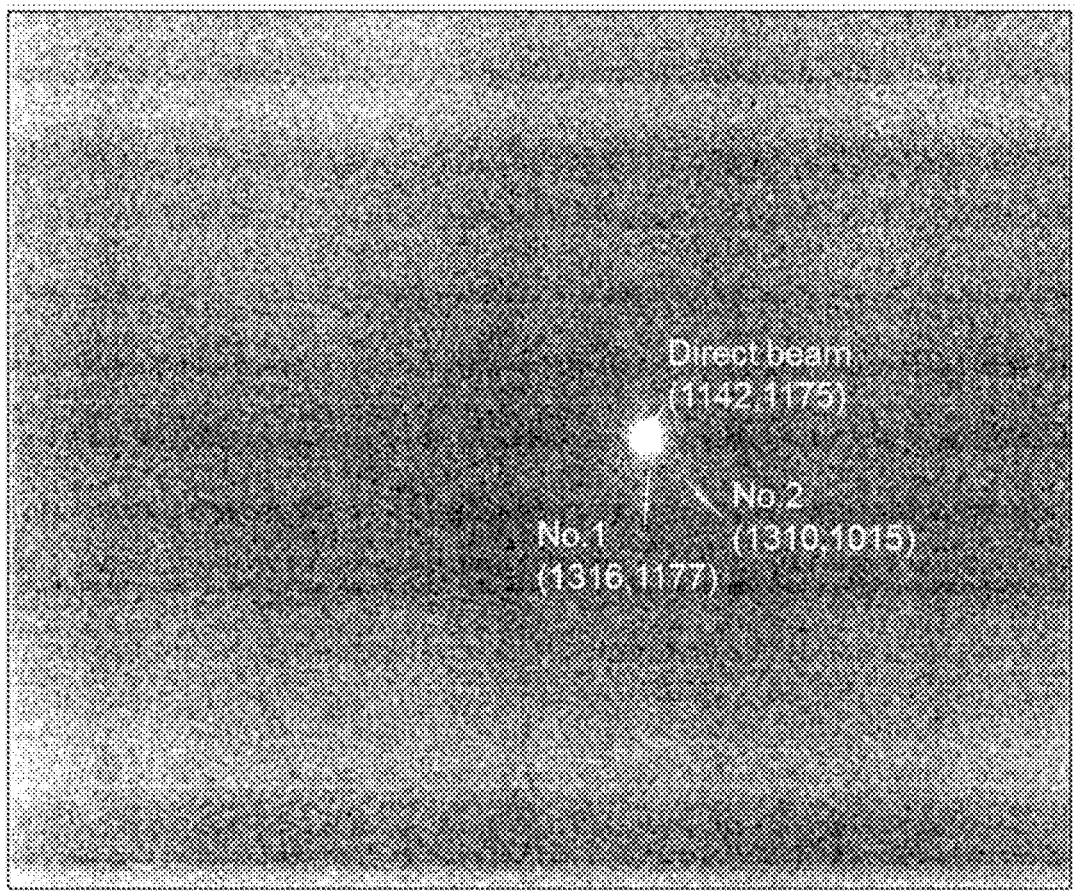
FIG. 23 is a view showing a Laue image measured in a blocked material in a single crystal state in the thickness of 7 mm.
Figure 24A:
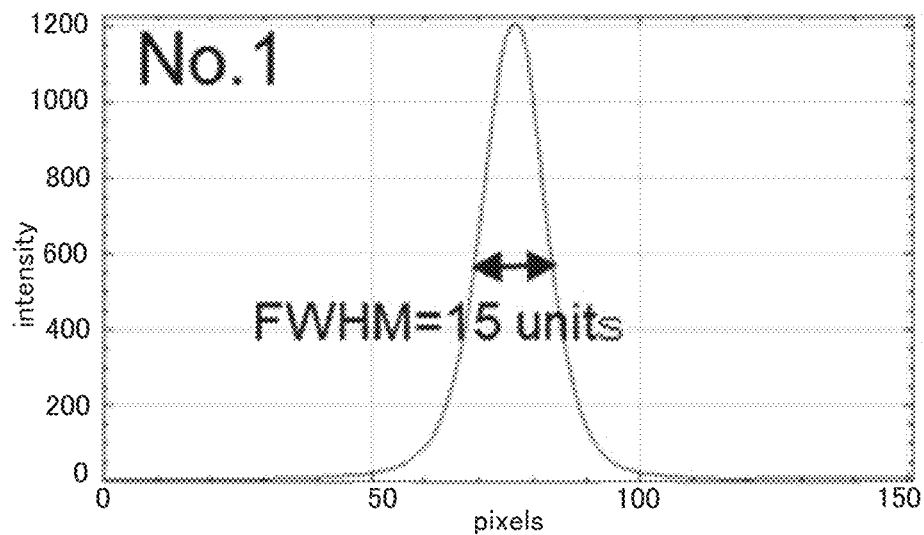
FIGS. 24A and 24B views showing profiles of the diffraction spots in FIG. 23, respectively.
Figure 24B:
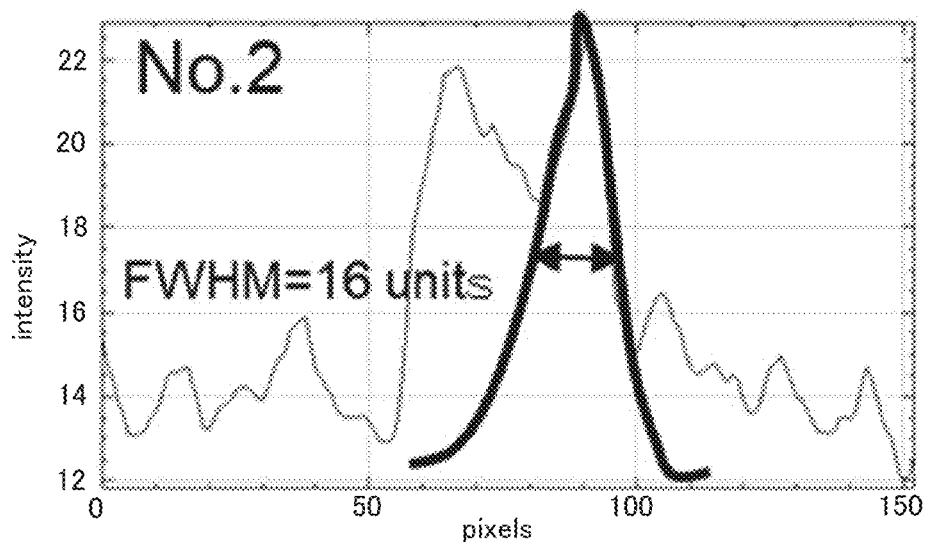

FIG. 23 is a view showing a Laue image measured in a blocked material in a single crystal state in the thickness of 7 mm. FIGS. 24A and 24B views showing profiles of the diffraction spots No. 1 and 2 in FIG. 23, respectively. The diffraction spot No. 2 shows an overlap of peaks, which could be separated into single peaks.

As shown in FIGS. 15 to 24, only one peak is included in the profile of most of the measured diffraction spots. The full widths at half maximum are equivalent when the peaks at different diffraction spots are compared. The overlap of the multiple peaks was also rarely measured for some of the diffraction spot profiles.

The observed peak is due to the diffracted X-rays generated by the subcrystalline grains in deep portion of the sample of the nickel-based superalloy aligned in the incident X-ray path. Therefore, it has been found that the damage degree of the deep portion of the sample which is a nickel-based superalloy material can be evaluated by observing the broadening of the full width at half maximum of the diffraction spot even for the samples having different thicknesses. At the time, it has been confirmed that the full widths at half maximum FWHM (=w) of the diffraction spots are not dependent on the diffraction angle 2θ, and the full widths at half maximum of the diffraction spots are equivalent.

Example 3

Figure 25:
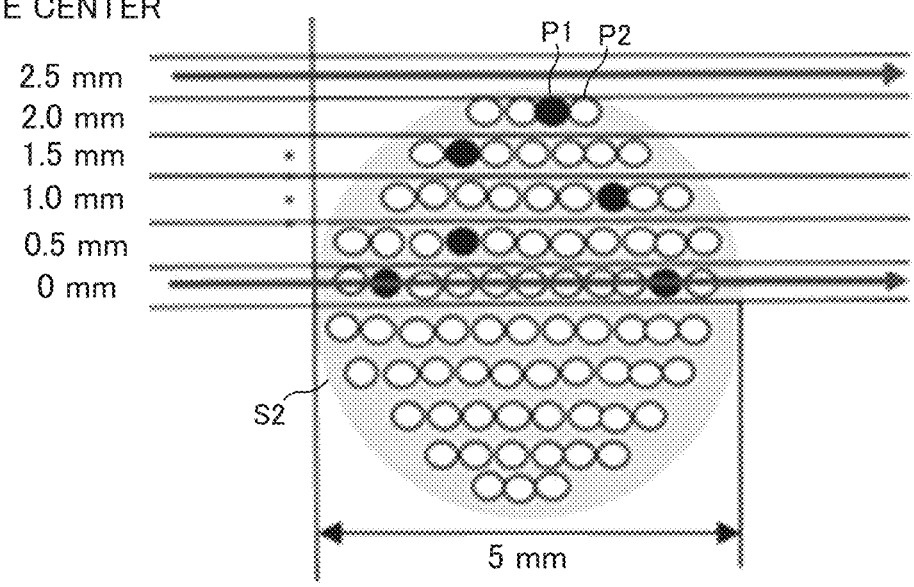
FIG. 25 is a schematic view showing a cross section of a cylindrical test piece.

Next, the cylindrical test piece with a diameter of 5 mm formed of nickel-based superalloy with dendritic structure with subcrystalline grain size of about several hundred micrometers was damaged and irradiated with X-rays. FIG. 25 is a schematic view showing a cross section of a cylindrical test piece S2. As shown in FIG. 25, in the cylindrical test piece S2, there are subcrystalline grains P1 contributing to diffraction and subcrystalline grains P2 not contributing to diffraction. Microbeam white X-rays with 100 keV or higher having a divergence angle of 0.2° or less were formed into a beam width of several hundred micrometers equivalent to the subcrystalline grain size, and irradiated to the positions of the distances 0 mm, 0.5 mm, 1.0 mm, 1.5 mm, 2.0 mm and 2.5 mm from the center of the cylindrical test piece, respectively.

Figure 26A:
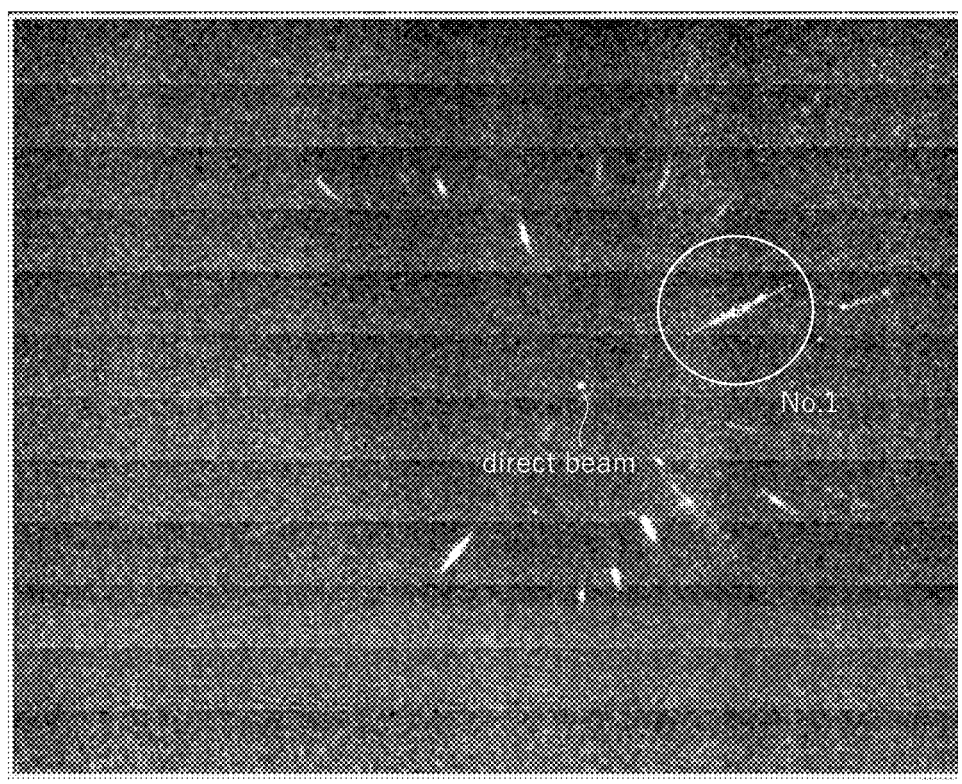
FIGS. 26A and 26B are views showing a Laue image and a profile of the diffraction spots on the Laue image when X-rays were irradiated to the center of the cylindrical test piece with 0% degree of damage, respectively.
Figure 26B:
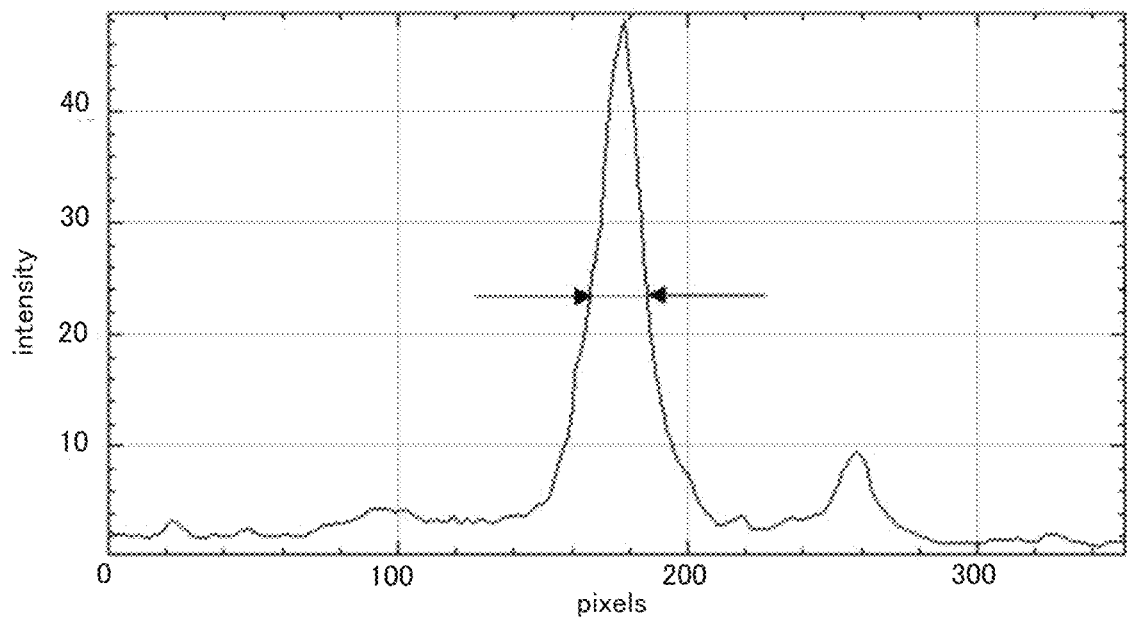

A plurality of single peak diffraction spots appeared on the cylindrical test pieces S2 with various degrees of damage. From the appearance of the diffraction spot, it was confirmed that the number of subcrystalline grains satisfying the diffraction condition in the X-ray path was limited to a very small number (1 to 2). FIGS. 26A and 26B are views showing a Laue image and a profile of the diffraction spot No. 1 on the Laue image when X-rays were irradiated to the center of the cylindrical test piece with 0% degree of damage, respectively. Only one peak is included in the profile of the diffraction spot. In addition, when the peaks at different diffraction spots are compared, the full widths at half maximum are equivalent.

Figure 27:
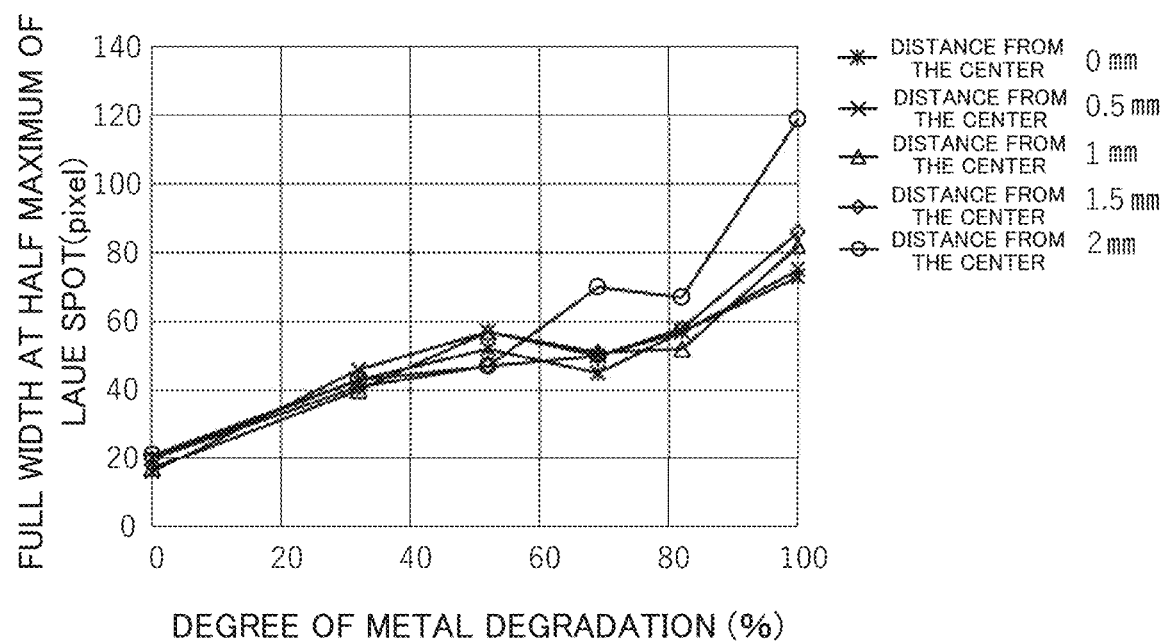
FIG. 27 is a graph showing the degrees of damage and the full widths at half maximum of diffraction spots of the cylindrical test piece S2.

FIG. 27 is a graph showing the degree of damages and the full widths at half maximum of diffraction spots of the cylindrical test piece S2. As shown in FIG. 27, a result was obtained in which the full width at half maximum of the Laue spot changed depending only on the degree of damage regardless of the thickness of the sample. Therefore, it was demonstrated that a calibration curve can be prepared regardless of the thickness of the sample, and that the damage degree can be stably evaluated even in an irregularly shaped material.

Example 4

X-rays with 150 keV were incident at low angles on a turbine blade with the TBC formed on a sample of nickel-based superalloy. The nickel-based superalloy is cast, wherein the first layer of TBC is formed of YSZ, and the second layer is formed of Co alloy.

Figure 28:
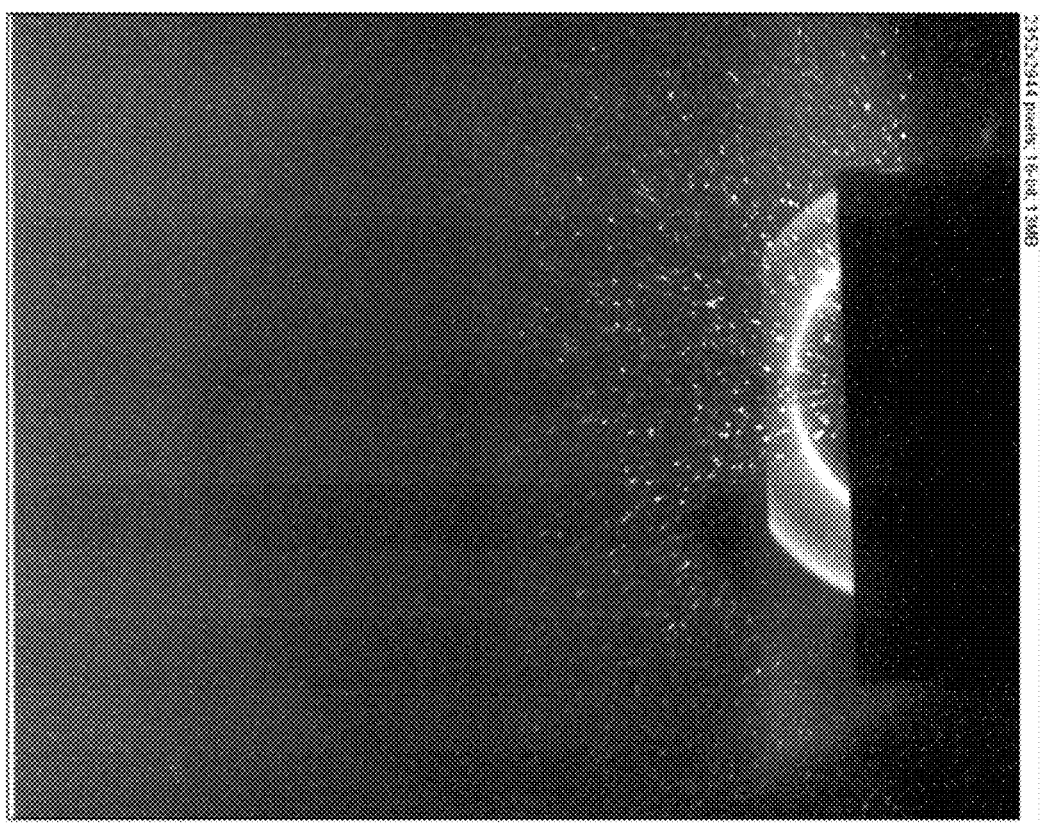
FIG. 28 is a diffraction image of TBC acquired with X-rays incident at low angle with 150 keV.

FIG. 28 is a diffraction image of TBC acquired with X-rays incident at low angle with 150 keV. Because of the low angle incidence of the X-rays, even when X-rays with 150 keV was used, all of the X-rays were diffracted in TBC, and X-rays did not reach the preform sample. Debye-Scherrer rings centered on the direct beam by alloyed layers of the TBC were observed in the diffraction image. In addition, a large number of small diffraction spots diffracted by coarse grains in the ceramic layer of the first layer of the TBC were observed.

Example 5

Diffraction peaks of the metallic structure of the base material were detected by irradiating X-rays with 150 keV and 50 keV to the turbine blade in which TBC was formed on the sample of the nickel-based superalloy. The nickel-based superalloy is cast, wherein the first layer of TBC is formed of YSZ, and the second layer is formed of Co alloy. The peak profiles were confirmed from the detected diffraction peaks.

Figure 29A:
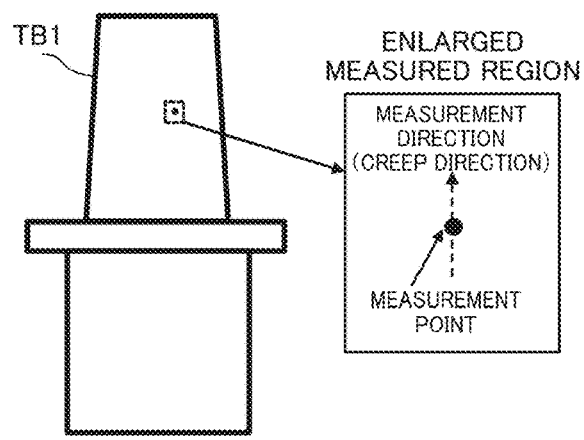
FIGS. 29A, 29B, and 29C are a schematic view of a sample, a diffraction image of the base material acquired with X-ray of 150 keV, and a peak profile, respectively.
Figure 29B:
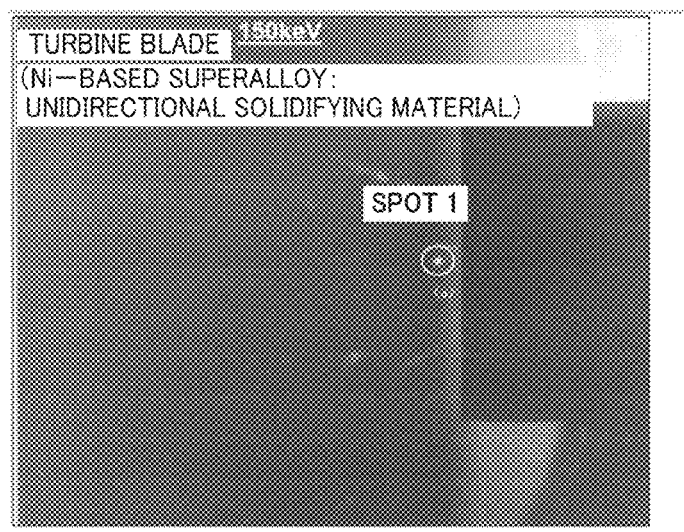
Figure 29C:
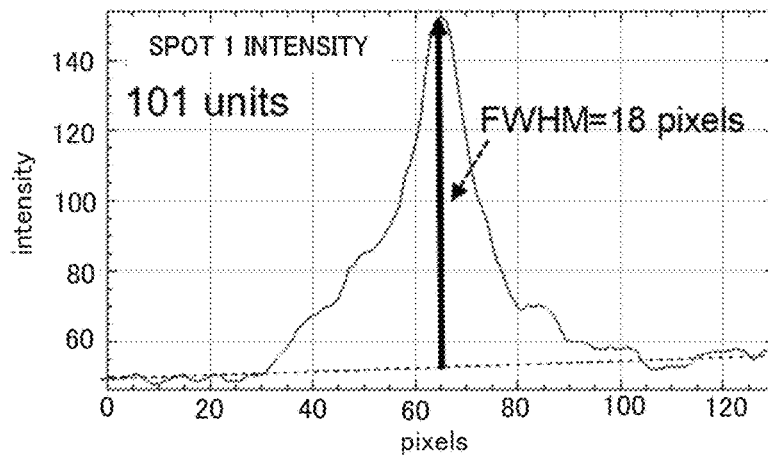

FIGS. 29A to 29C are a schematic view of a sample, a diffraction image of the base material acquired with X-ray of 150 keV, and a peak profile, respectively. As shown in FIG. 29A, the diffraction spots were measured in the deformation direction of the damaged turbine blade TB1. As shown in FIG. 29B, a number of X-ray diffraction spots have been observed. It is considered that the X-ray energy is sufficiently high, and that X-rays transmitted through TBC to reach the base material.

FIG. 29C shows the peak profile when the position of the diffraction spot indicated by the spot 1 is scanned in one direction. As shown in FIG. 29C, a peak of the diffraction spot due to the subcrystalline grains of the base material sample was clearly observed.

Figure 30A:
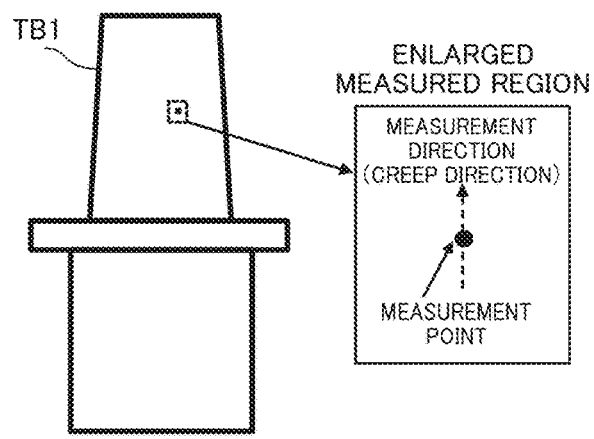
FIGS. 30A, 30B, and 30C are a schematic view of a sample, a diffraction image of the base material acquired with X-ray of 50 keV, and a peak profile, respectively.
Figure 30B:
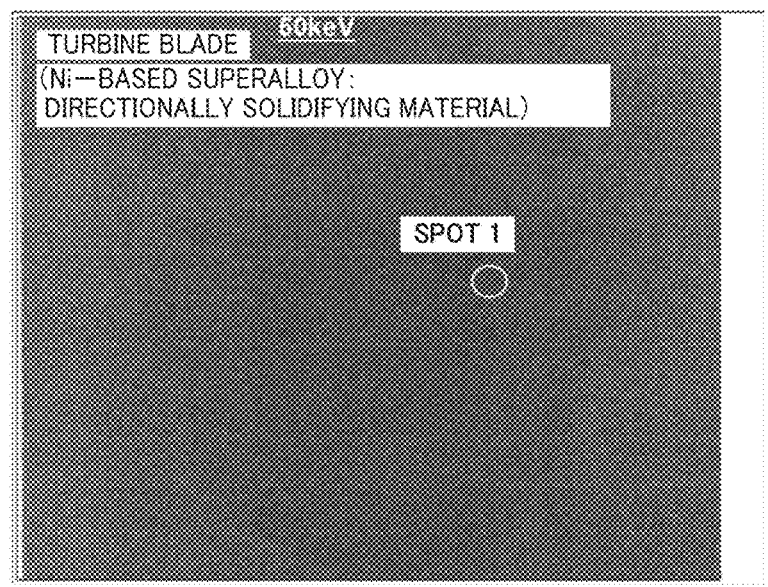
Figure 30C:
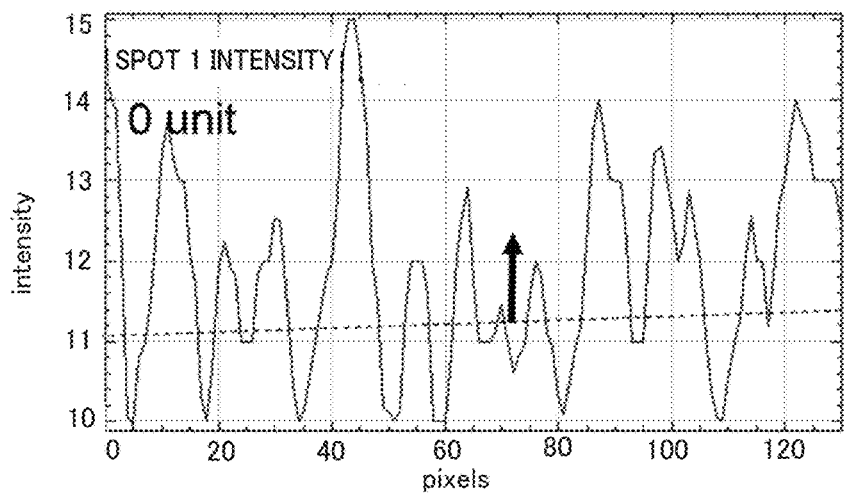

FIGS. 30A to 30C are a schematic view of a sample, a diffraction image of the base material acquired with X-ray of 50 keV, and a peak profile, respectively. As shown in FIG. 30C, the diffraction spots were measured in the deformation direction of the damage of the turbine blade TB1.

As shown in FIG. 30B, no X-ray diffraction spot has been observed. The position shown as spot 1 indicates the position of the diffraction spot when the X-ray with 150 keV was irradiated. It is considered that all X-rays were absorbed by the TBC and the X-rays did not reach the base material.

FIG. 30C shows the peak profile when X-rays with 150 keV were irradiated and the position of the diffraction spots is scanned in one direction. As shown in FIG. 30C, no peaks are visible.

Example 6

A 150 keV X-ray was irradiated to a turbine blade having TBC formed on a sample of nickel-based superalloy, and a diffracted image was obtained. The nickel-based superalloy is cast, wherein the first layer of TBC is formed of YSZ, and the second layer is formed of Co alloy. FWHM analysis was carried out on the obtained diffraction peak, and a calibration curve was prepared from it, and the degree of damage was estimated.

Figure 31:
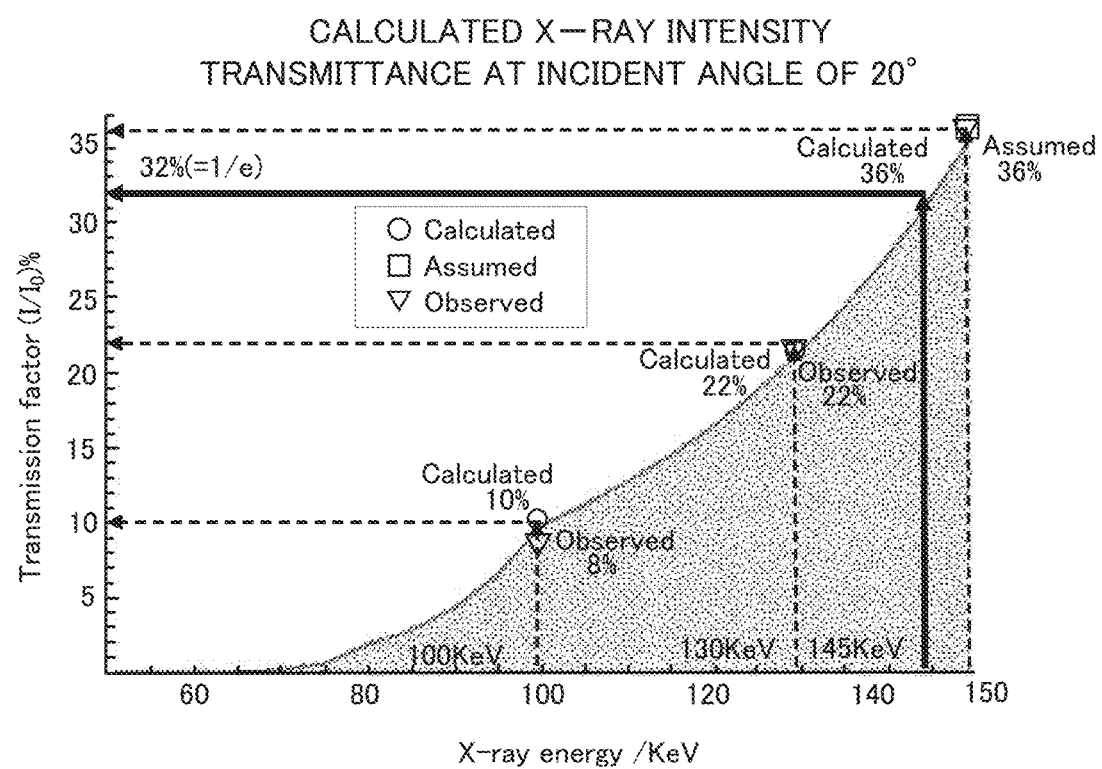
FIG. 31 is a graph showing the transmittance of X-ray intensity to X-ray energy for comparing measured values with calculated values.

FIG. 31 is a graph showing the transmittance of X-ray intensity to X-ray energy for comparing measured values with calculated values. FIG. 31 shows the calculated result of the relation between X-ray energy and X-ray transmittance ($I_m/I_0$). TBC comprises a first layer formed of 1000 μm thick YSZ coating having a porosity of 15.7%, and a second layer formed of 160 μm thick Co—Ni (1:1) coating.

When the calculated transmittance of the X-ray with the energy of 150 keV is 36%, it is assumed that the X-ray intensity of 101 units for the X-ray energy 150 keV corresponds to 36% of the X-ray transmittance. For X-ray energies of 100 keV and 130 keV, the observed X-ray intensities were 25 units and 64 units, respectively. The X-ray transmittances obtained from the above correspondence to them were 8% and 22%, respectively. The values obtained from these observations were equivalent to the calculated values of 10% and 22%, and the accuracy of this calculation was confirmed.

By using the above described calculation methods, it is possible to calculate 145 keV as the X-ray energy for which the effective X-ray sensitivity of the sample is 1/e or higher. Thus, it is possible to estimate the X-ray energy required for the measurement to be 1/e by making a graph based on this calculation for a material of known composition.

Example 7

Figure 32:
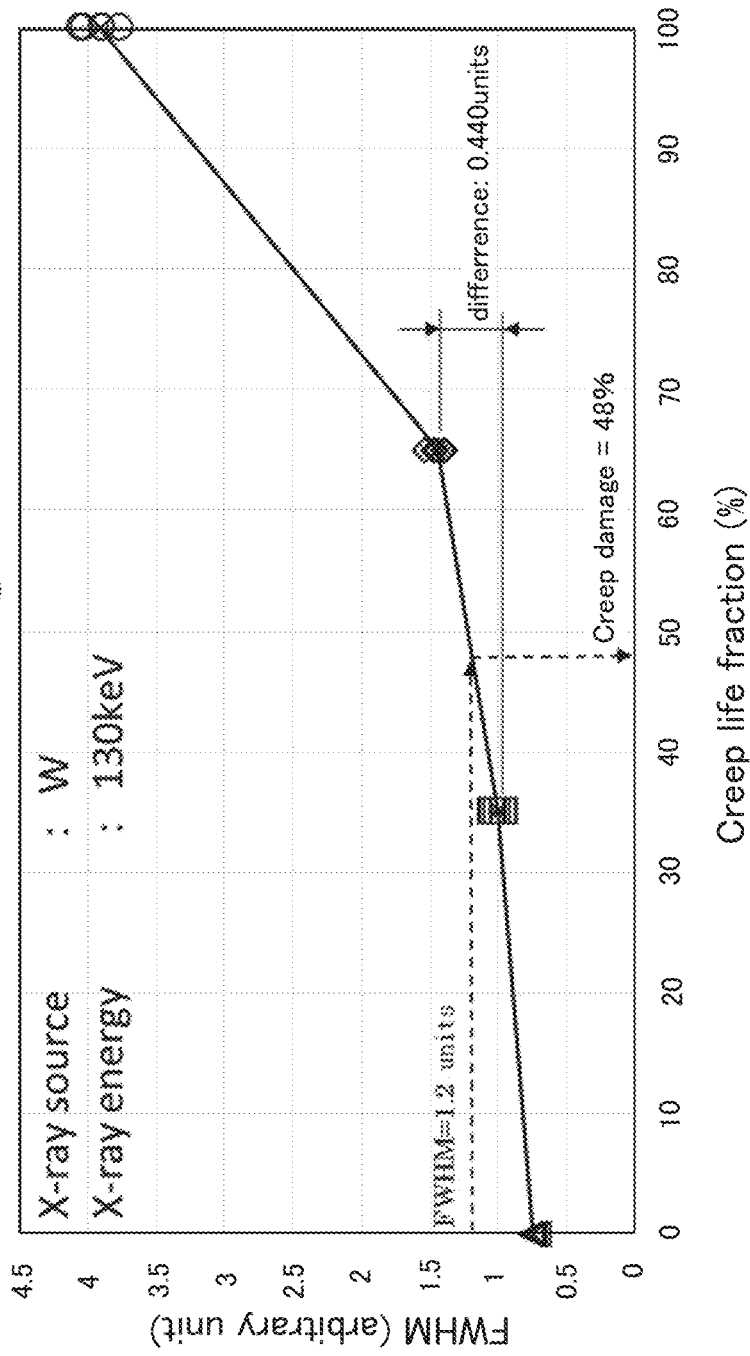
FIG. 32 is a graph showing the degrees of damage estimated from FWHM analysis of peaks with the base material structure as measured by X-ray of 130 keV.

FIG. 32 is a graph showing the degrees of damage estimated from FWHM analysis of peaks with the base material structure as measured by X-ray of 130 keV. The graph shown in FIG. 31 is a master curve estimating damage of the base material prepared for a turbine blade having TBC formed on a sample of a nickel-based superalloy. The base material damage estimating curves are obtained by pre-damaging and deforming the turbine blades until they break at high temperature and high loads (e.g., 760° C., 440 Mpa).

The FWHM=1.2 units shown in the graph is the mean measured value of the diffraction spots relative to the estimated part of the turbine blade. At this time, when the master curve is used, the damage degree of the test sample can be estimated to be 48%.

What is claimed is:

1. A damage measurement method, comprising:
   irradiating microbeam white X-rays with 70 keV or higher to a sample in a single crystal state,
   detecting a diffraction spot generated by the irradiation,
   calculating a coefficient on variance of an intensity distribution in a specific direction in the detected diffraction spot, and
   specifying a damage state of the sample based on the calculated coefficient,
   wherein the sample is a metal material having a dendritic structure, and
   the detected diffraction spot occurs at 100 μm or more below the surface over the sample.

2. The damage measurement method according to claim 1,
   wherein the damage state is defined by a degree of damage and a direction of damage.

3. The damage measurement method according to claim 1,
   wherein the sample is a single crystal material, a directionally solidified material or a polycrystalline material.

4. The damage measurement method according to claim 1,
   wherein the irradiated white X-ray is incident at 90° with respect to a surface of the sample, and
   the diffraction spot is detected by a transmission method, the transmission method has a predetermined relationship between an incident X-ray and a diffracted X-ray.

5. The damage measurement method according to claim 1,
   wherein the sample is coated with a polycrystalline coating.

6. The damage measurement method according to claim 1,
   wherein the white X-ray to be irradiated is formed into a focal size at a sample position equivalent to a grain size of a subcrystalline grain in the sample.

7. An X-ray diffraction apparatus used for the damage measurement method according to claim 1, comprising:
   an X-ray irradiator configured to irradiate microbeam white X-rays to a sample,
   a sample stage for mounting the sample, and an X-ray detector configured to detect X-rays diffracted by the sample, wherein the sample is in a single crystal state.

8. A damage measurement method 3, comprising:
irradiating microbeam white X-rays to a sample in a single crystal state;
detecting a diffraction spot generated by the irradiation, calculating a coefficient on variance of an intensity distribution in a specific direction in the detected diffraction spot; and
specifying a damage state of the sample based on the calculated coefficient:
wherein an energy of the irradiated white X-ray is set such that a transmittance at a position in a depth of 7 mm in the sample from an incident position on the sample is 1/e or higher.

9. A damage measurement method, comprising:
irradiating microbeam white X-rays to a sample in a single crystal state;
detecting a diffraction spot generated by the irradiation, calculating a coefficient on variance of an intensity distribution in a specific direction in the detected diffraction spot; and
specifying a damage state of the sample based on the calculated coefficient;
wherein the irradiated white X-rays have a focal spot size of 150 μm or more and 500 μm or less at a sample position.

10. A damage measurement method, comprising:
irradiating microbeam white X-rays to a sample in a single crystal state;
detecting a diffraction spot generated by the irradiation, calculating a coefficient on variance of an intensity distribution in a specific direction in the detected diffraction spot; and
specifying a damage state of the sample based on the calculated coefficient;
wherein a collimator forms a divergence angle of the white X-rays and wherein the divergence angle of the white X-ray is 0.2° or less.

11. An X-ray diffraction apparatus, comprising:
an X-ray irradiator configured to irradiate microbeam white X-rays to a sample,
a sample stage for mounting the sample, and
an X-ray detector configured to detect X-rays diffracted by the sample,
wherein the sample is in a single crystal state, and
wherein the X-ray irradiator includes a collimator for forming a divergence angle of the irradiated white X-rays to 0.2° or less.

12. A damage measurement apparatus comprising:
processing circuitry configured to
calculate a coefficient on variance of an intensity distribution in a specific direction in a diffraction spot based on intensity data acquired by irradiating microbeam white X-rays with 70 keV or higher to a sample in a single crystal state, and
specify a damage state of the sample based on the calculated coefficient,
wherein the sample is a metal material having a dendritic structure, and
the detected diffraction spot occurs at 100 μm or more below the surface over the sample.

13. A non-transitory computer readable recording medium having recorded thereon a damage measurement program causing a computer to execute a method, the method comprising:
calculating a coefficient on variance of an intensity distribution in a specific direction in a diffraction spot based on intensity data acquired by irradiating microbeam white X-rays with 70 keV or higher to a sample in a single crystal state, and
specifying a damage state of the sample based on the calculated coefficient,
wherein the sample is a metal material having a dendritic structure, and
the detected diffraction spot occurs at 100 μm or more below the surface over the sample.

14. A damage measurement apparatus comprising:
processing circuitry configured to
calculate a coefficient on variance of an intensity distribution in a specific direction in a diffraction spot based on intensity data acquired by irradiating microbeam white X-rays to a sample in a single crystal state, and
specify a damage state of the sample based on the calculated coefficient,
wherein an energy of the irradiated white X-ray is set such that a transmittance at a position in a depth of 7 mm in the sample from an incident position on the sample is 1/e or higher.

15. A damage measurement apparatus comprising:
processing circuitry configured to
calculate a coefficient on variance of an intensity distribution in a specific direction in a diffraction spot based on intensity data acquired by irradiating microbeam white X-rays to a sample in a single crystal state, and
specify a damage state of the sample based on the calculated coefficient,
wherein the irradiated white X-rays have a focal spot size of 150 μm or more and 500 μm or less at a sample position.

16. A damage measurement apparatus comprising:
processing circuitry configured to
calculate a coefficient on variance of an intensity distribution in a specific direction in a diffraction spot based on intensity data acquired by irradiating microbeam white X-rays to a sample in a single crystal state, and
specify a damage state of the sample based on the calculated coefficient,
wherein a collimator forms a divergence angle of the white X-rays, and
wherein the divergence angle of the white X-ray is 0.2° or less.

17. A non-transitory computer readable recording medium having recorded thereon a damage measurement program causing a computer to execute a method, the method comprising:
calculating a coefficient on variance of an intensity distribution in a specific direction in a diffraction spot based on intensity data acquired by irradiating microbeam white X-rays to a sample in a single crystal state; and
specifying a damage state of the sample based on the calculated coefficient,
wherein an energy of the irradiated white X-ray is set such that a transmittance at a position in a depth of 7 mm in the sample from an incident position on the sample is 1/e or higher.

18. A non-transitory computer readable recording medium having recorded thereon a damage measurement program causing a computer to execute a method, the method comprising:

calculating a coefficient on variance of an intensity distribution in a specific direction in a diffraction spot based on intensity data acquired by irradiating microbeam white X-rays to a sample in a single crystal state; and specifying a damage state of the sample based on the calculated coefficient, wherein the irradiated white X-rays have a focal spot size of 150 μm or more and 500 μm or less at a sample position.

19. A non-transitory computer readable recording medium having recorded thereon a damage measurement program causing a computer to execute a method, the method comprising:

calculating a coefficient on variance of an intensity distribution in a specific direction in a diffraction spot based on intensity data acquired by irradiating microbeam white X-rays to a sample in a single crystal state, and specifying a damage state of the sample based on the calculated coefficient, wherein a collimator forms a divergence angle of the white X-rays, and wherein the divergence angle of the white X-ray is 0.2° or less.

\* \* \* \* \*